US012302964B2

(12) United States Patent
Herbert et al.

(10) Patent No.: US 12,302,964 B2
(45) Date of Patent: May 20, 2025

(54) PERSONAL PROTECTION SYSTEM AND METHOD

(71) Applicant: PABBAN DEVELOPMENT, INC., Irvine, CA (US)

(72) Inventors: Jacob Herbert, Irvine, CA (US); Bradford H. Hack, Irvine, CA (US); Lawrence J. Green, Irvine, CA (US); Dina El Sherif, Irvine, CA (US); Christopher Simbulan, Irvine, CA (US); H. Nicholas Herbert, Irvine, CA (US); Carlo C. Memita, Irvine, CA (US)

(73) Assignee: Pabban Development, Inc., Irvine, CA (US)

(*) Notice: Subject to any disclaimer, the term of this patent is extended or adjusted under 35 U.S.C. 154(b) by 0 days.

(21) Appl. No.: 18/028,450

(22) PCT Filed: Oct. 27, 2022

(86) PCT No.: PCT/US2022/048064
§ 371 (c)(1),
(2) Date: Mar. 24, 2023

(87) PCT Pub. No.: WO2023/076498
PCT Pub. Date: May 4, 2023

(65) Prior Publication Data

US 2023/0292857 A1 Sep. 21, 2023

Related U.S. Application Data

(60) Provisional application No. 63/272,633, filed on Oct. 27, 2021.

(51) Int. Cl.
*A41D 13/11* (2006.01)
*A62B 7/10* (2006.01)
(Continued)

(52) U.S. Cl.
CPC ...... *A41D 13/1153* (2013.01); *A41D 13/1184* (2013.01); *A62B 7/10* (2013.01); *A62B 18/045* (2013.01); *A62B 18/084* (2013.01)

(58) Field of Classification Search
CPC ..... A62B 7/10; A62B 9/04; A62B 17/00–003; A62B 17/006; A62B 17/04;
(Continued)

(56) References Cited

U.S. PATENT DOCUMENTS 4,590,951 A 5/1986 O'Connor
4,701,965 A 10/1987 Landis
(Continued)

FOREIGN PATENT DOCUMENTS

AU 2010212282 A1 3/2011
CA 3119117 A1 12/2021
(Continued)

OTHER PUBLICATIONS

PCT International Search Report and Written Opinion for PCT/US2022/048064, Pabban Development, Inc., Forms PCT/ISA/220, 210, and 237 dated Feb. 14, 2023 (10 pages).
(Continued)

*Primary Examiner* — Rachel T Sippel
(74) *Attorney, Agent, or Firm* — BLAIR WALKER IP SERVICES, LLC

(57) ABSTRACT

A protective headgear system includes a cover including a substantially transparent facial shield, a sheet sealingly coupled to the facial shield around the cover's perimeter, the sheet including a substantially anterior portion including a first sheet material configured to act as a substantial barrier to the passage of air, and including a substantially posterior portion including a second sheet material configured to filter contaminants from air, and one or more seams between the first sheet material and the second sheet material, a flow
(Continued)

restrictor configured to significantly create a flow barrier between the cover and the neck of a user for providing an interior volume, an air mover configured to draw some of the external air into the interior volume, a filter coupled to the cover, and one or more flow directors configured to direct internal air, including at least some exhaled air, toward the second sheet material.

31 Claims, 26 Drawing Sheets

(51) Int. Cl.
*A62B 18/04* (2006.01)
*A62B 18/08* (2006.01)

(58) Field of Classification Search
CPC .... A62B 18/04–045; A62B 18/08–084; A62B 18/088; A62B 23/00–025; A41D 13/1153; A41D 13/1184
See application file for complete search history.

(56) References Cited

U.S. PATENT DOCUMENTS 5,042,474 A 8/1991 Williamson
5,054,480 A 10/1991 Bare et al.
5,592,936 A 1/1997 Thomas, Jr. et al.
5,655,374 A 8/1997 Santilli et al.
5,711,033 A 1/1998 Green et al.
6,340,024 B1 * 1/2002 Brookman ............. A62B 17/04 128/201.15
6,481,019 B2 11/2002 Diaz et al.
6,513,168 B2 2/2003 Paris et al.
6,805,124 B2 10/2004 Japuntich et al.
6,918,141 B2 7/2005 Green et al.
8,453,262 B2 6/2013 Green
10,384,084 B2 8/2019 Isham et al.
10,939,712 B1 3/2021 McBride et al.
11,065,479 B1 7/2021 Rafalovich et al.
11,116,998 B2 9/2021 Duffy
11,122,842 B2 9/2021 Blake et al.
11,123,581 B1 9/2021 Salvino et al.
11,123,582 B2 9/2021 Tuffery
11,130,008 B2 9/2021 Walker et al.
11,166,497 B1 11/2021 Wilson et al.
11,166,852 B2 11/2021 Gardner et al.
11,253,022 B2 2/2022 Frejd
11,278,077 B2 3/2022 Muske et al.
11,278,749 B2 3/2022 McLaughlin et al.
11,284,655 B2 3/2022 Pavalarajan et al.
11,318,333 B1 5/2022 Ellerbrake
11,383,107 B2 7/2022 Connor
11,399,580 B2 8/2022 Rosati et al.
11,547,169 B2 1/2023 Jefferis et al.
11,547,880 B2 1/2023 Oliver, III
2003/0075174 A1 * 4/2003 Shahaf ................... A62B 17/04 128/201.25
2003/0111075 A1 * 6/2003 Wen ....................... A62B 18/02 128/201.25
2007/0044800 A1 3/2007 Church et al.
2007/0221214 A1 * 9/2007 Brockman ............. A62B 17/04 128/201.25
2007/0240716 A1 10/2007 Marx
2007/0240719 A1 10/2007 Duarte
2009/0151055 A1 * 6/2009 Duncan .................. A62B 17/04 2/205
2015/0314144 A1 11/2015 Virr et al.
2016/0243383 A1 8/2016 Yazdi et al.
2016/0317848 A1 * 11/2016 Zilberstein ................ B03C 3/70
2017/0196281 A1 7/2017 Rosati et al.
2017/0367426 A1 12/2017 Egeland et al.
2018/0028846 A1 2/2018 Hur et al.
2019/0009115 A1 1/2019 Zhong
2020/0060359 A1 * 2/2020 Jascomb ................ A42B 3/044
2020/0406069 A1 12/2020 Fu
2021/0220678 A1 7/2021 Sernfält et al.
2021/0283434 A1 9/2021 Eitzman et al.
2021/0289851 A1 9/2021 Hall et al.
2021/0289875 A1 9/2021 Hall et al.
2021/0289876 A1 9/2021 Hall et al.
2021/0290987 A1 9/2021 Salvino et al.
2021/0290989 A1 9/2021 Hall et al.
2021/0298370 A1 9/2021 Watters
2021/0299484 A1 * 9/2021 Werjefelt ............... A42B 3/225
2021/0308499 A1 10/2021 Gomes et al.
2021/0322800 A1 10/2021 Chessari et al.
2021/0330418 A1 10/2021 Saadat et al.
2021/0379312 A1 12/2021 Bernard et al.
2021/0392988 A1 12/2021 Jefferis et al.
2022/0000209 A1 1/2022 Hall et al.
2022/0001220 A1 1/2022 McLaughlin et al.
2022/0016450 A1 1/2022 Hall et al.
2022/0016451 A1 1/2022 Hall et al.
2022/0023674 A1 1/2022 Kohrman et al.
2022/0023677 A1 1/2022 Chen et al.
2022/0038314 A1 2/2022 Pavalarajan et al.
2022/0087356 A1 3/2022 Asnis et al.
2022/0125150 A1 4/2022 Frejd
2022/0126126 A1 4/2022 Clack
2022/0143344 A1 5/2022 Mauger
2022/0152431 A1 5/2022 Iaquinto et al.
2022/0193467 A1 7/2022 Jung et al.
2022/0211136 A1 7/2022 Muske et al.
2022/0233896 A1 * 7/2022 Kimbahune ........... A41D 13/11
2022/0266068 A1 8/2022 Connor
2022/0295923 A1 9/2022 Hall et al.
2022/0295935 A1 9/2022 Hall et al.
2022/0296933 A1 9/2022 Godwin et al.
2022/0296939 A1 9/2022 Hall et al.
2022/0331618 A1 10/2022 Asselin
2023/0015114 A1 1/2023 Gillespie et al.
2023/0024861 A1 1/2023 Hall et al.
2023/0028200 A1 1/2023 Hall et al.
2023/0029404 A1 1/2023 Hall et al.

FOREIGN PATENT DOCUMENTS

CN 204259915 U 4/2015
CN 108904937 A 11/2018
EP 1204453 B1 7/2003
EP 3151924 B1 4/2017
EP 3187229 A1 7/2017
EP 2662118 B1 9/2021
EP 3399881 B1 11/2021
EP 3988849 A1 4/2022
EP 3431147 B1 9/2022
GB 2594100 A 10/2021
WO WO2013/082650 A1 6/2013
WO WO2015/036652 A1 3/2015
WO WO2015061848 A1 5/2015
WO WO2015170997 A1 11/2015
WO WO2015/185884 A1 12/2015
WO WO2017/120562 A2 7/2017
WO WO2017180391 A1 10/2017
WO WO2020/115704 A1 6/2020
WO WO2020/160607 A1 8/2020
WO WO2021/022018 A1 2/2021
WO WO2021/050916 A1 3/2021
WO WO2021/099881 A1 5/2021
WO WO2021/183984 A1 9/2021
WO WO2021/195115 A1 9/2021
WO WO2021/195511 A1 9/2021
WO WO2021/205182 A1 10/2021
WO WO2021/207233 A1 10/2021
WO WO2021/207268 A1 10/2021
WO WO2021/247716 A2 12/2021
WO WO2022/018405 A1 1/2022
WO WO2022/018406 A1 1/2022
WO WO2022/018407 A1 1/2022
WO WO2022/018408 A1 1/2022
WO WO2022/038358 A1 2/2022
WO WO2022/048887 A2 3/2022

(56) References Cited

FOREIGN PATENT DOCUMENTS

| | | | |
|---|---|---|---|
| WO | WO2022/101807 | A1 | 5/2022 |
| WO | WO2022/212528 | A1 | 10/2022 |
| WO | WO2022/221783 | A1 | 10/2022 |

OTHER PUBLICATIONS

CN108904937A (Machine translation) (8 pages).

3M Versaflo Healthcare PAPR Kit TR-300N+ Hkl, Medium-Large (1 page) (available on internet on or before Mar. 24, 2022).

Steri-Shield™ Helmet System for Infection Control (4 pages). Public distribution was prior to Oct. 27, 2021.

Extended European Search Report dated Feb. 12, 2025, in EP App. No. 22888190.0, filed Oct. 27, 2022 (10 pages).

* cited by examiner

PERSONAL PROTECTION SYSTEM AND METHOD

BACKGROUND OF THE INVENTION

Field of the Invention

The field of the invention generally relates to personal protection systems, including, but not limited to personal environmental protections systems. The personal protections systems often include a headgear structure which is worn by an individual to protect from particulate material. The personal protection systems may provide filtered air to the user. The field may relate to devices, apparatus or methods for life-saving, including devices for medical use. The field may relate to respirators or may related to respiratory apparatus, such as respiratory apparatus for medical purposes, including apparatus with filter elements.

SUMMARY OF THE INVENTION

In one embodiment of the present disclosure, a protective headgear system includes a cover configured to cover the head of a user, the cover including a substantially transparent facial shield having a perimeter, a sheet sealingly coupled to the facial shield around its perimeter, wherein the sheet includes a substantially anterior portion including a first sheet material configured to act as a substantial barrier to the passage of air, the sheet further including a substantially posterior portion including a second sheet material configured to filter contaminants from air, the sheet further including one or more seams between the first sheet material and the second sheet material, a flow restrictor configured to significantly create a flow barrier between the cover and the neck of the user for providing an interior volume within the cover, significantly isolated from external air, an air mover configured to draw some of the external air into the interior volume of the cover, a filter coupled to the cover and configured to filter the air drawn by the air mover, and one or more flow directors configured to be carried within the cover and configured to direct internal air, including at least some exhaled air from the user, toward the second sheet material of the posterior portion of the sheet.

In another embodiment of the present disclosure, a protective headgear system includes a support configured to engage the head of a user, and a cover configured to be coupled to the support and to cover the head of a user, the cover including a substantially transparent facial shield and sheet material sealingly coupled to the facial shield, wherein the cover further includes a first portion on the sheet material configured to filter contaminants from air, a second portion at an upper edge of the sheet material configured to substantially surround and engage a perimeter of the support to minimize air flow from between the cover and the support, and a third portion including a flow restrictor configured to significantly create a flow barrier between the cover and the neck of the user, wherein the cover provides an interior volume configured to isolate air supplied to the user.

In still another embodiment of the present disclosure, a protective headgear system includes a cover configured to cover the head of a user, the cover including a substantially transparent facial shield and sheet material sealingly coupled to the facial shield, wherein the sheet material includes at least a portion configured to filter contaminants from air, wherein the cover provides an interior volume configured to isolate air supplied to the user, an input blower configured to draw air into the interior volume of the cover, and an output blower configured to draw air out of the interior volume of the cover through at least a portion of the sheet material, wherein the input blower and the output blower are configured to be individually controlled.

In yet another embodiment of the present disclosure, a protective headgear system includes a cover configured to cover the head of a user, the cover including a substantially transparent facial shield and a sheet material sealingly coupled to the facial shield, the sheet material configured to filter contaminants from air, wherein the cover provides an interior volume configured to isolate air supplied to the user, wherein a volume of at least 500 cubic centimeters of open space is adjacent the face of the user when the cover is placed on the head of the user with the facial shield in front of the face of the user, and a blower configured to draw air into the interior volume of the cover and/or configured to draw air out of the interior volume of the cover through the sheet material.

In still another embodiment of the present disclosure, a protective headgear system includes a cover configured to cover the head of a user, the cover including a substantially transparent facial shield and a sheet material sealingly coupled to the facial shield, the sheet material configured to filter contaminants from air, wherein the cover provides an interior volume configured to isolate air supplied to the user, a blower configured to draw air into the interior volume of the cover and to draw air out of the interior volume of the cover through the sheet material, and an exit orifice coupled to and downstream of the sheet material, the exit orifice having an adjustable flow resistance.

In yet another embodiment of the present disclosure, a protective headgear system includes a cover configured to cover the head of a user, the cover including a substantially transparent facial shield and sheet material sealingly coupled to the facial shield, wherein the sheet material includes at least a portion configured to filter contaminants from air, wherein the cover provides an interior volume configured to isolate air supplied to the user, an outlet filter configured to filter air exiting the cover, and a blower configured to draw air into the interior volume of the cover, wherein the cover includes one or more channels configured to direct the air toward the outlet filter.

In still another embodiment of the present disclosure, a protective headgear system includes a support configured to engage the head of a user, a cover configured to be coupled to the support and to cover the head of a user, the cover including a substantially transparent facial shield and sheet material sealingly coupled to the facial shield, wherein the sheet material includes at least a portion configured to filter contaminants from air, wherein the cover provides an interior volume configured to isolate air supplied to the user, an outlet filter configured to filter air exiting the cover, and a blower configured to draw air into the interior volume of the cover, wherein the support includes one or more channels configured to direct the air toward the outlet filter.

In yet another embodiment of the present disclosure, a protective headgear system includes a cover configured to cover the head of a user, the cover including a fabric, the cover arranged in a first layer configured to cover a posterior portion of a user's head and an second layer, at least partially covering the first layer, and configured to cover at least the lower portion of the user's face, wherein neither the first layer or the second layer cover the earholes of the user, thus allowing free access to in-the-ear earphones or earplugs.

In still another embodiment of the present disclosure, a protective headgear system includes a cover configured to cover the head of a user, the cover including a substantially transparent facial shield and sheet material sealingly coupled to the facial shield, wherein the sheet material includes at least a filtering portion configured to filter contaminants from gases, wherein the cover provides an interior volume isolated from external air, an air mover configured to draw some of the external air into the interior volume of the cover, a filter coupled to the cover and configured to filter the drawn air, and one or more channels carried by the cover and configured to direct internal air within the interior volume, including at least some exhaled air from the user, toward the filtering portion of the sheet material.

In yet another embodiment of the present disclosure, a protective headgear system includes a cover configured to cover the head of a user, the cover including a substantially transparent facial shield and sheet material sealingly coupled to the facial shield, wherein the sheet material includes at least a filtering portion configured to filter contaminants from gases, wherein the cover provides an interior volume isolated from external air, an air mover configured to draw some of the external air into the interior volume of the cover, a filter coupled to the cover and configured to filter the drawn air, and one or more directors carried by the cover and configured to direct internal air within the interior volume, including at least some exhaled air from the user, toward the filtering portion of the sheet material.

DETAILED DESCRIPTION OF THE ILLUSTRATED EMBODIMENTS

Figure 1:
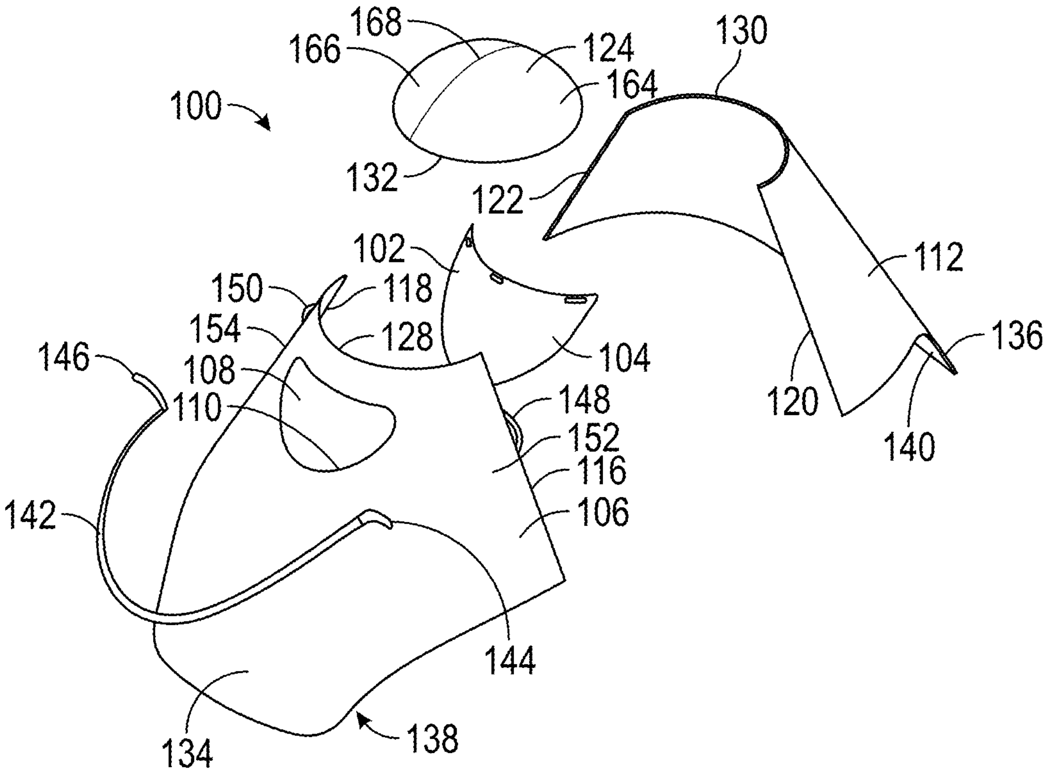
FIG. 1 is an exploded view of a hood assembly, according to an embodiment of the present disclosure.
Figure 2:
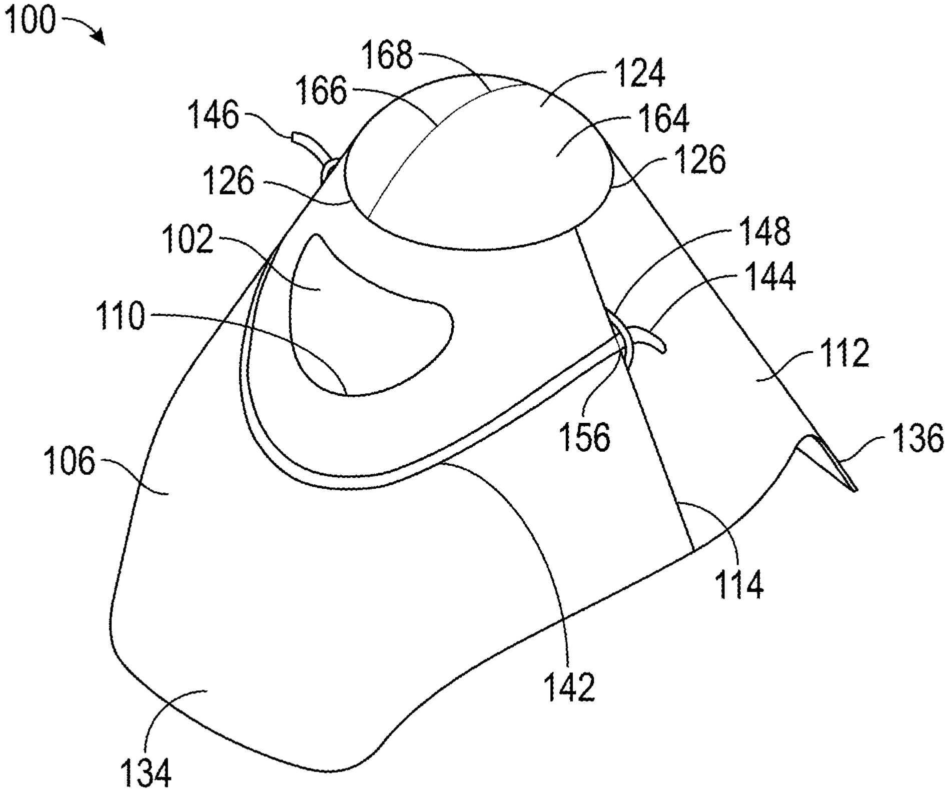
FIG. 2 is a perspective view of the hood assembly.
Figure 3:
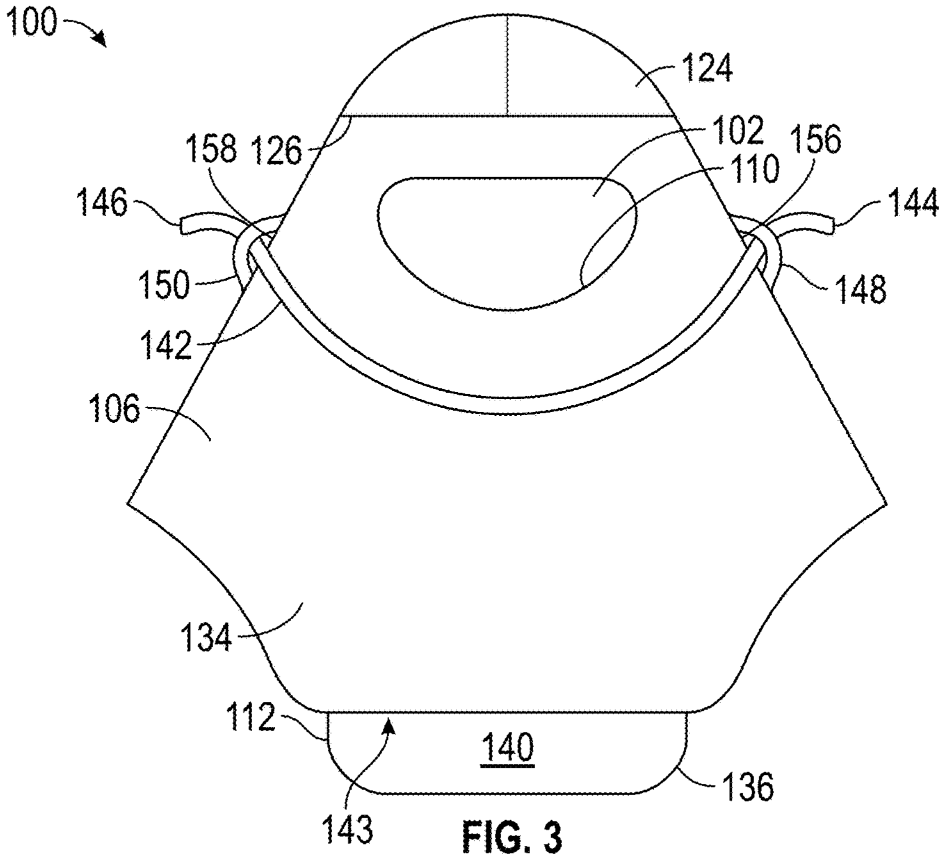
FIG. 3 is a front view of the hood assembly.
Figure 4:
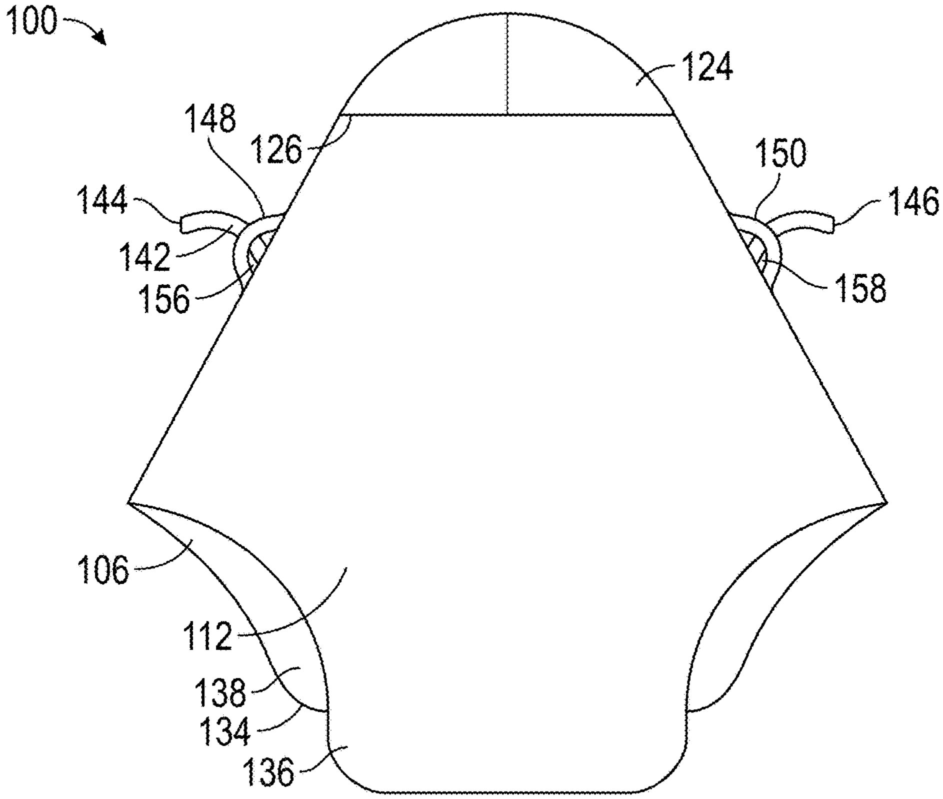
FIG. 4 is a back view of the hood assembly.
Figure 5:
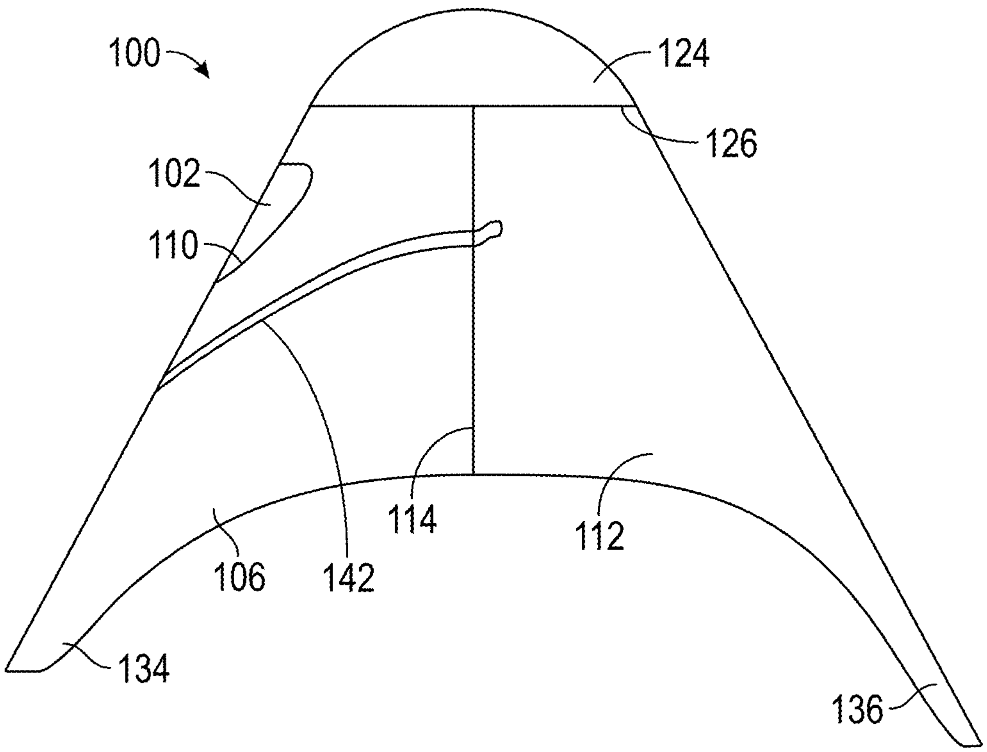
FIG. 5 is a left side view of the hood assembly.
Figure 6:
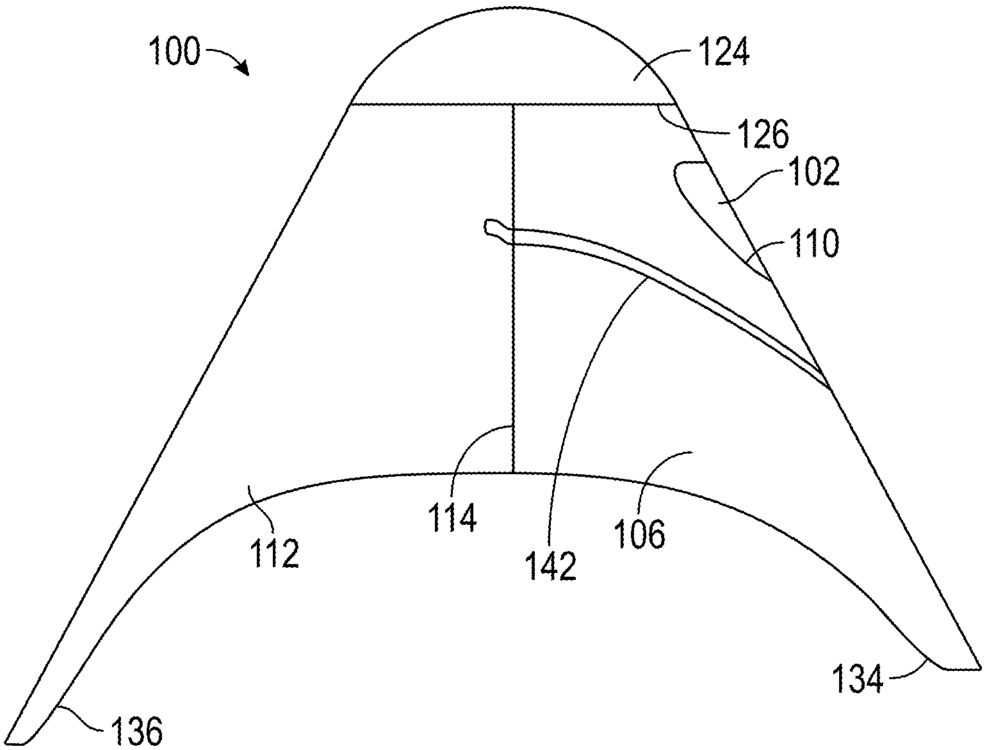
FIG. 6 is a right side view of the hood assembly.
Figure 7:
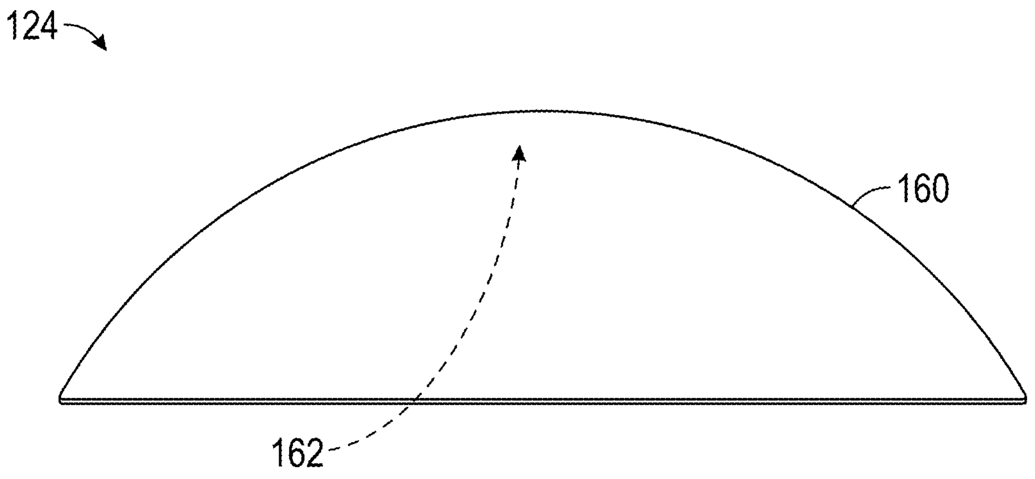
FIG. 7 is a front view of a filter assembly of the hood assembly, according to an embodiment of the present disclosure.
Figure 8:
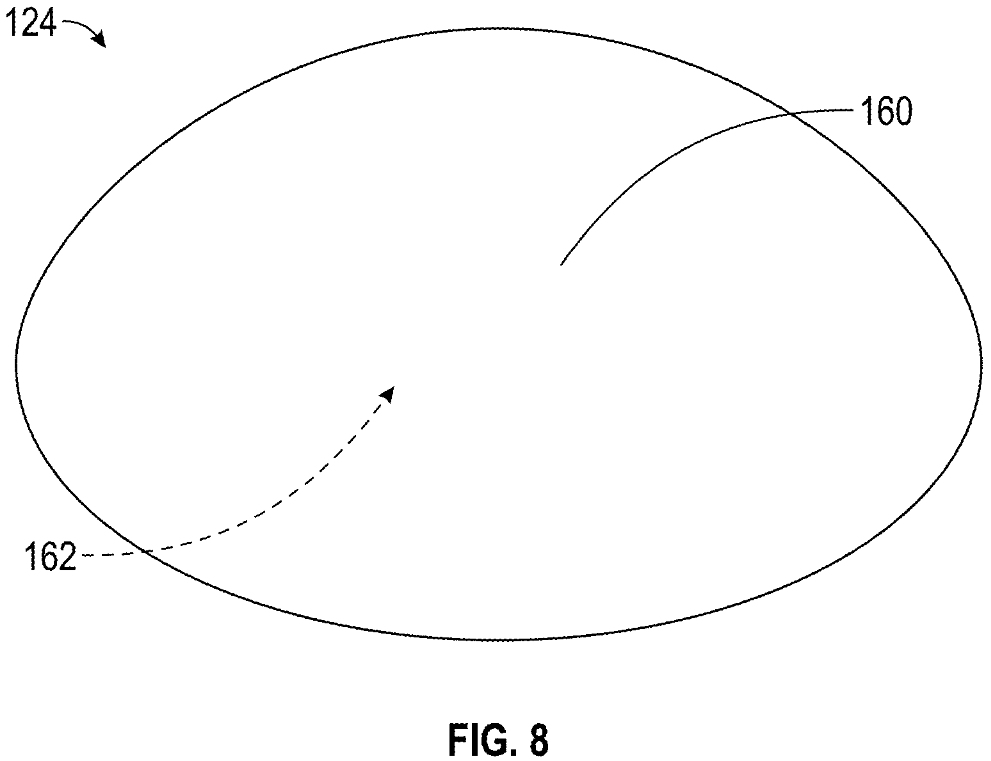
FIG. 8 is a perspective view of the filter assembly.
Figure 9:
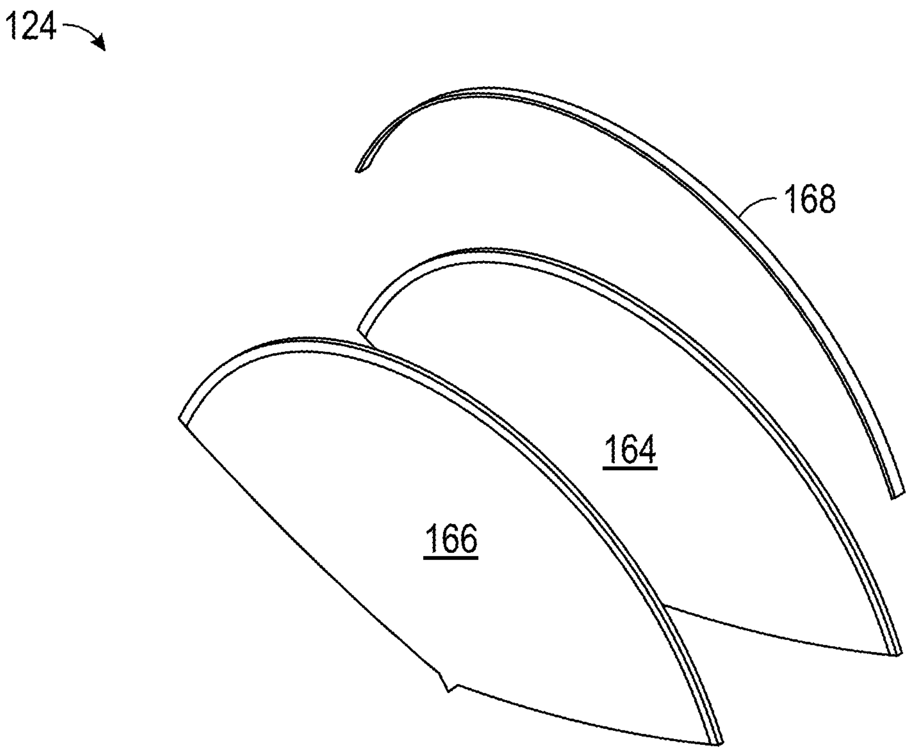
FIG. 9 is an exploded view of the filter assembly.

There are several types of air flow, filtration and protective systems which are known in the art. Several types of such systems are currently available on the market for use in surgical arenas, in "clean room" environments, or in hazardous/contaminated environments.

Some of the existing systems include hoods, gowns, filters, and the like. In some instances, the air filters are built into the helmet structure. Known units frequently include external sources of air such as gas cylinders, air lines or the like which are connected to the helmet structure by tubes, hoses or the like. Air from the surrounding environment may be filtered and supplied by the system into the helmet interior. Some currently available lens/facial seal combinations, sometimes known as loose-fitting hoods, are expensive to manufacture due to the geometries required for the facial seal to attach to the lens which is curved in a plane perpendicular to the seal to the face/head of the wearer. Several embodiments disclosed herein include different configurations of achieving a space within a covering or barrier around the head of a user, wherein the flow of filtered air into the space may be controlled. Several embodiments disclosed herein include different configurations of achieving a space within a covering or barrier around the head of a user, wherein the flow of filtered air out of the space may be controlled. The filtering of the air brought into the space can be done with the primary objective of providing a safe, clean, healthy, comfortable, and visually clear environment for the user. The filtering of the air being removed from the space can be done with the primary objective of providing a safe, clean, and healthy environment for persons other than the user who may temporarily or continually/continuously inhabit the same general work area.

The systems described herein may also be utilized for general healthcare use or general laboratory use, as well as in surgery, medical procedure, or dental use. The systems may comprise PAPR (Powered Air Purifying Respirator) systems comprising a blower with a motor, but may also comprise non-powered systems, including physical or acoustical protection systems, such as those used in construction or airport or raceway communication and/or protection. The systems described herein may also be utilized in general PPE (personal protective equipment).

FIGS. 1-6 and 19-21 illustrate a hood assembly 100 configured to protect a user for external contagious vectors, including a virus, such as the SARS-CoV-2 virus that is the basis of COVID-19. In some embodiments, the hood assembly 100 may additionally be configured to protect others from the user, for example, if the user is personally carrying a contagious virus, or other spreadable vector. This may be of high concern if the vector either has a potentially dangerous or deadly outcome for certain human subjects and/or if the vector is particularly contagious, for example, by small liquid particles or droplets through the air. A transparent facial shield 102 is sealably attached at its periphery 104 to an anterior sheet 106 around a perimeter 110 an aperture 108 of the anterior sheet 106, for example, at seam 109 (see FIGS. 19-20). The transparent facial shield 102 allows the user to clearly view the surroundings while wearing the hood assembly 100. The seam 109 may comprise adhesive, epoxy, hot melt, or thermal and/or pressure bonding and/or sealing. The anterior sheet 106 is attached to a posterior sheet 112 by seams 114 (or hems) between left and right lateral edges 116, 118 of the anterior sheet 106 and, respectively, left and right lateral edges 120, 122 of the posterior sheet 112. The seams 114 may be formed by a number of different methods, including, but not limited to, adhesives, epoxies, hot melts, sewing, fasteners, pins, hook and loop (Velcro®), snaps, buttons, clasps, or other methods that allow for close fitting between the edges (116, 120 or 118, 122) without significant gaps or openings. In some embodiments, the seams 114 comprise an airtight seal. In some embodiments, the seams 114 do not comprise a seal, but comprise a barrier to the passage of air at least as effective as the material of the anterior sheet 106 and/or the posterior sheet 112. In some embodiments, the material of the anterior sheet 106 and/or the posterior sheet 112 may comprise a woven or tightly-woven fabric.

In some embodiments, the anterior sheet 106 and/or the posterior sheet 112 may comprise a breathable soft composite material, for example a Type 4 composite material, per AAMI PB70 and/or EN13795 standards. In some embodiments, the anterior sheet 106 and/or the posterior sheet 112 may comprise a meltblown polypropylene material. Materials for the anterior sheet 106 and/or the posterior sheet 112 may in some embodiments include a tri-laminate comprising a film held between two layers of non-woven plastic fabric. Bi-laminate materials are also possible, such as a material comprising a film layer and a non-woven plastic fabric. In some embodiments, the non-woven layer or layers may comprise a cellulose. In some embodiments, the non-woven layer may comprise spun materials such as spunbonded high density polyethylene (e.g., Tyvek®, a trademark of DuPont de Nemours, Inc.). In one embodiment a spunbond meltblown spunbond, commonly known as SMS, may be used, and comprises a tri-laminate non-woven fabric comprising a top layer of spunbond polypropylene, a middle layer of meltblown polypropylene and a bottom layer of spunbond polypropylene. In other embodiments, one or more of the non-woven layers may be replaced by a woven layer.

In some embodiments, the facial shield 102 may comprise a sheet comprising high clarity polymer such as polyethylene terephthalate glycol (PETG), polyethylene terephthalate (PET), or other polyesters or polyester copolymers, or acrylic, or polycarbonate, such that it can provide a relatively thin but tough barrier that does not significantly impede the vision of the user. In some embodiments, the facial shield 102, in use with the hood assembly 100, may be configured to substantially control the breathing environment of the user via air filtration, inflow (intake), and/or outflow (exhaust), and may utilize the operative elements for air filtration, inflow, and/or outflow in any of the embodiments. In use, the facial shield 102 has a permanent concave shape toward the user and a permanent convex shape away from the user. In some embodiments the facial shield 102 may comprise a flat flexible sheet that can be produced by die cutting or other rapid processes that allow for improved mass production and reduced cost. The facial shield 102 is flexible and may conform to a variety of curves, such as the curve required to mate with a helmet or support that is configured to engage with the head of the user. In some embodiments, the facial shield 102 may comprise polycarbonate having a thickness of between about 0.010 inch and about 0.020 inch, or between about 0.012 inch and about 0.018 inch, or between about 0.014 inch and about 0.016 inch. In some embodiments, the facial shield 102 may comprise PET having a thickness of between about 0.004 inch and about 0.012 inch, or between about 0.006 inch and about 0.010 inch, or between about 0.007 inch and about 0.009 inch.

The anterior sheet 106 and the posterior sheet 112 are attached to an inlet filter 124 by seams 126 (or hems) between an upper edge 128 of the anterior sheet 106 and an upper edge of 130 of the posterior sheet 112 with a lower edge 132 of the inlet filter 124. The seams 126 may be formed by a number of different methods, including adhesives, epoxies, hot melts, sewing, fasteners, pins, hook and loop (Velcro®), snaps, buttons, clasps, or other methods that allow for close fitting between the edges (128, 132 or 130, 132) without significant gaps or openings. In some embodiments, the seams 126 comprise an airtight seal. In some embodiments, the seams 126 do not comprise a seal, but comprise a barrier to the passage of air at least as effective as the material of the anterior sheet 106, the posterior sheet 112, and/or the inlet filter 124. In some embodiments, the filter 124 may comprise a meltblown polypropylene material or filter media.

Figure 13:
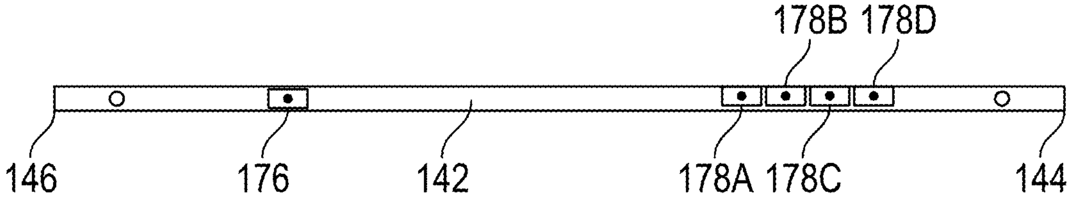
FIG. 13 is a neck tie assembly of the hood assembly, according to an embodiment of the present disclosure.
Figure 14:
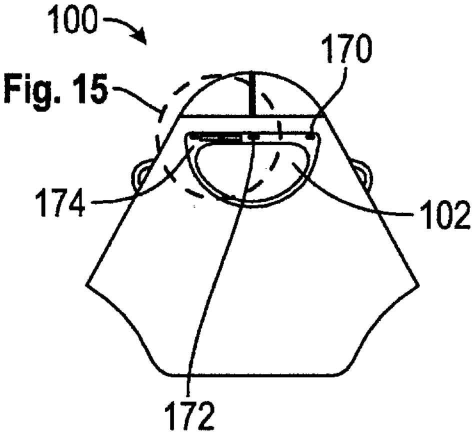
FIG. 14 is a front view of the hood assembly, according to an embodiment of the present disclosure.
Figure 15:
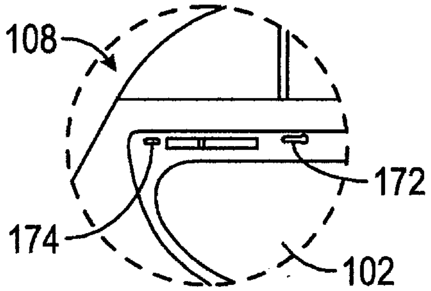
FIG. 15 is a detail view of the hood assembly taken within circle 15 of FIG. 14.

The hood assembly 100 is configured to be placed over the head of a user. A front tail 134 and/or back tail 136 may be tucked in to a gown or other body-covering garment (not shown). In some usage configurations, the tails 134, 136 are not tucked in. In other usage configurations, the tails 134, 136 are both tucked in and a portion of the mid-area of the hood assembly 100 is also tucked in. A user may choose, for example, a larger size or oversize hood assembly 100 in order to tuck in more. In other embodiments an underside 138 of the front tail 134 and/or underside 140 of the back tail 136 may include adhesive, hook and loop, or other fastening elements in order to be secured (permanently or removably) to an outer portion of a gown or other body-covering garment (not shown). An elongate tie 142, having a first end 144 and a second end 146, is configured to secure the hood assembly 100 to the user, for example, around the neck of the user. The tie 142 may be secured around the hood assembly 100 and tightened and/or tied. In some embodiments, the tie 142 can be adjusted in order to at least partially control the amount of air that is able to enter the interior of the hood assembly 100 at a particular time (i.e., inlet flow rate). In some embodiments, the tie 142 can be adjusted to at least partially adjust the total internal volume of the interior 143 of the hood assembly 100. A variety of different hood assembly 100 sizes may also be offered. In some embodiments, it is desired that the internal volume of the interior 143 of the hood assembly 100, when in place upon a user, is sized such that a volume of at least 500 cubic centimeters of open space is adjacent the face of the user. Adjacent the face may include directly in front of the face, directly to either side or both sides of the face, and/or just above or below the face. A volume of at least 500 cc allows for comfort, and assures that the air being breathed in an out is able to freely move and correspond with the flow path of the system. The anterior sheet 106 comprises a left loop 148 and a right loop 150, respectively, extending from a left side 152 and right side 154 of the anterior sheet 106. The first end 144 of the tie 142 is configured to be inserted through a hole 156 in the left loop 148, and the second end 146 of the tie 142 is configured to be inserted through a hole 158 in the right loop 150. Turning to FIG. 13, the tie 142 can be secured but snapping female snap 176 to one of male snaps 178A-D, which are located at different lengths of the tie 142, such that that the securement of the snaps 176, 178 is appropriate for different-sized users. Alternatively, the tie 142 can simply be tied to itself.

Figure 10:
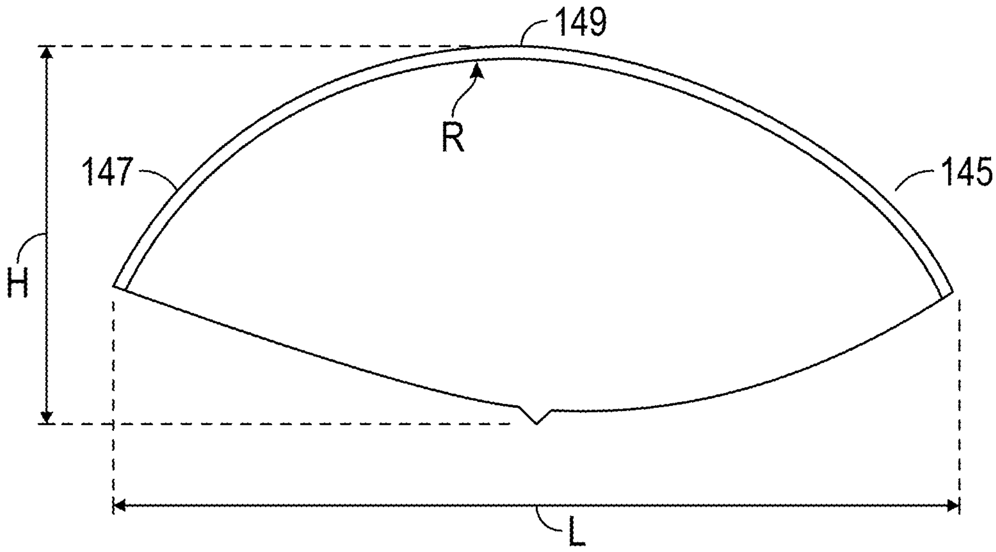
FIG. 10 is a detailed plan view of the filter assembly.
Figure 11:
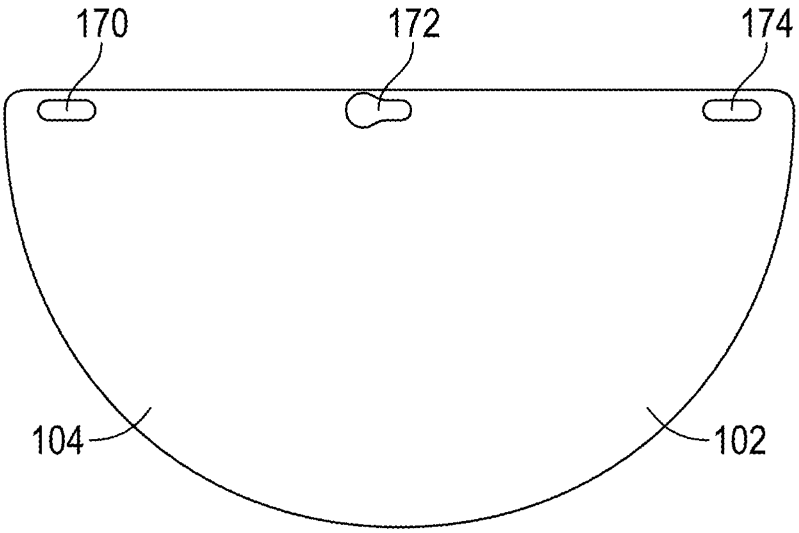
FIG. 11 is a plan view of a facial shield of the hood assembly, according to an embodiment of the present disclosure.
Figure 12:
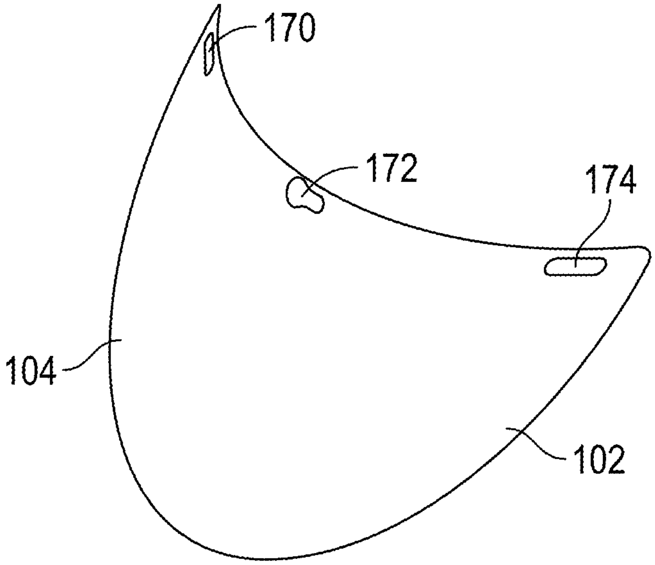
FIG. 12 is a perspective view of the facial shield.

Turning to FIGS. 7-10, the inlet filter 124 includes a top convex portion 160 and an inner concave portion 162. In some embodiments, as shown in FIGS. 1-2 and 9-10, the inlet filter 124 may be two-sided, with a first filter material sheet 164 secured to a second filter material sheet 166 with a ribbon 168 connecting them at their edges along the apex. Thus, although the first sheet 164 and the second sheet 166 may be identical to each other (e.g., cut from the same pattern, from the same base material), they may be attached together to form the contours that will correctly conform to a user's head shape. In the figures, the first sheet 164 represents a left side and the second sheet 166 represents a right side. The sheets 164, 166 and the ribbon 168 may be connected by any manner including, but not limited to, adhesives, epoxies, welding, hot melts, sewing, fasteners, pins, hook and loop (Velcro®), snaps, buttons, clasps, or other methods. In some embodiments, the sheets 164, 166 may be connected directly to each other, without the use of the ribbon 168. Turning to FIG. 10, the overall length L of the inlet filter 124 may be between about 14.50 cm and about 21.75 cm, or between about 16.25 cm and about 20.00 cm. The overall height H of the inlet filter 124 may be between about 7.50 cm and about 11.50 cm, or between about 8.50 cm and about 10.50 cm. The upper radius of curvature R can vary between about 6.75 cm and about 18.75 cm, or between about 8.00 cm and about 16.00 cm. The radius of curvature R at a front portion 145 or at a back portion 147 may be toward the lower end of the range, while the radius of curvature R near a central portion 149 may be closer to a middle or upper portion of the range. In other embodiments, the inlet filter 124 may comprise a single filter material sheet, or may comprise three or more sheets. The facial shield 102, as shown in FIGS. 11-12 and FIGS. 14-15 may comprise multiple holes 170, 172, 174, which will be described in more detail in an alternative embodiment of FIGS. 16-18.

Figure 16:
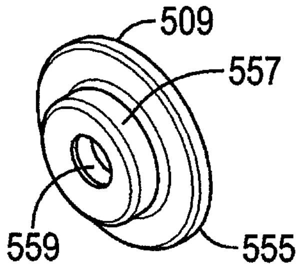
FIG. 16 is a perspective view of the center hook of the hood assembly.
Figure 17:
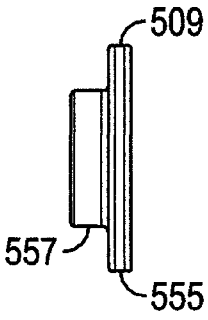
FIG. 17 is a side view of the center hook of FIG. 16.
Figure 18:
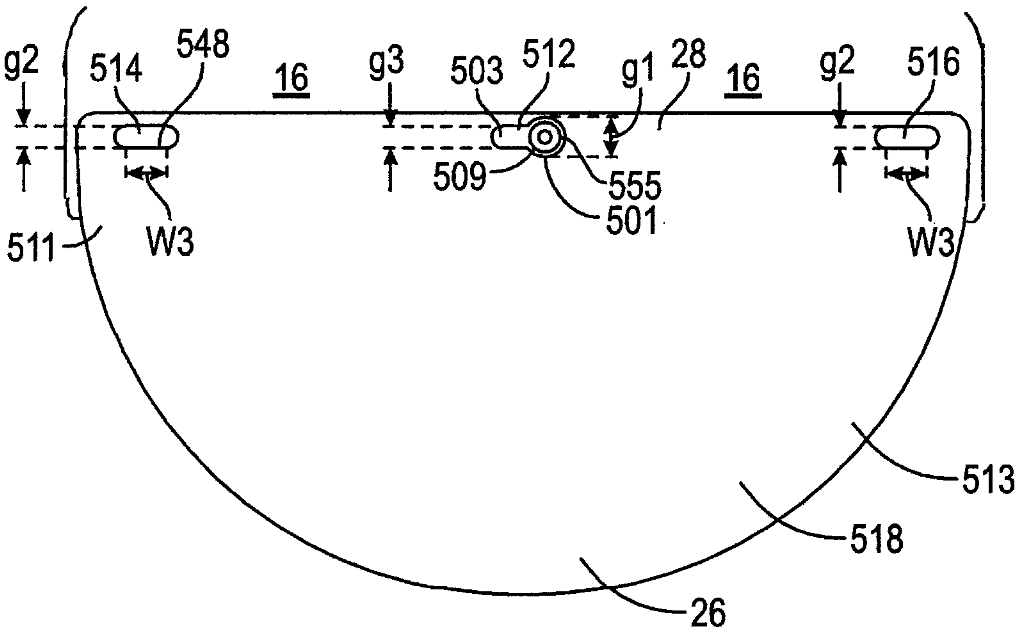
FIG. 18 is a facial shield and center hook of the hood assembly, according to an embodiment of the present disclosure.
Figure 19:
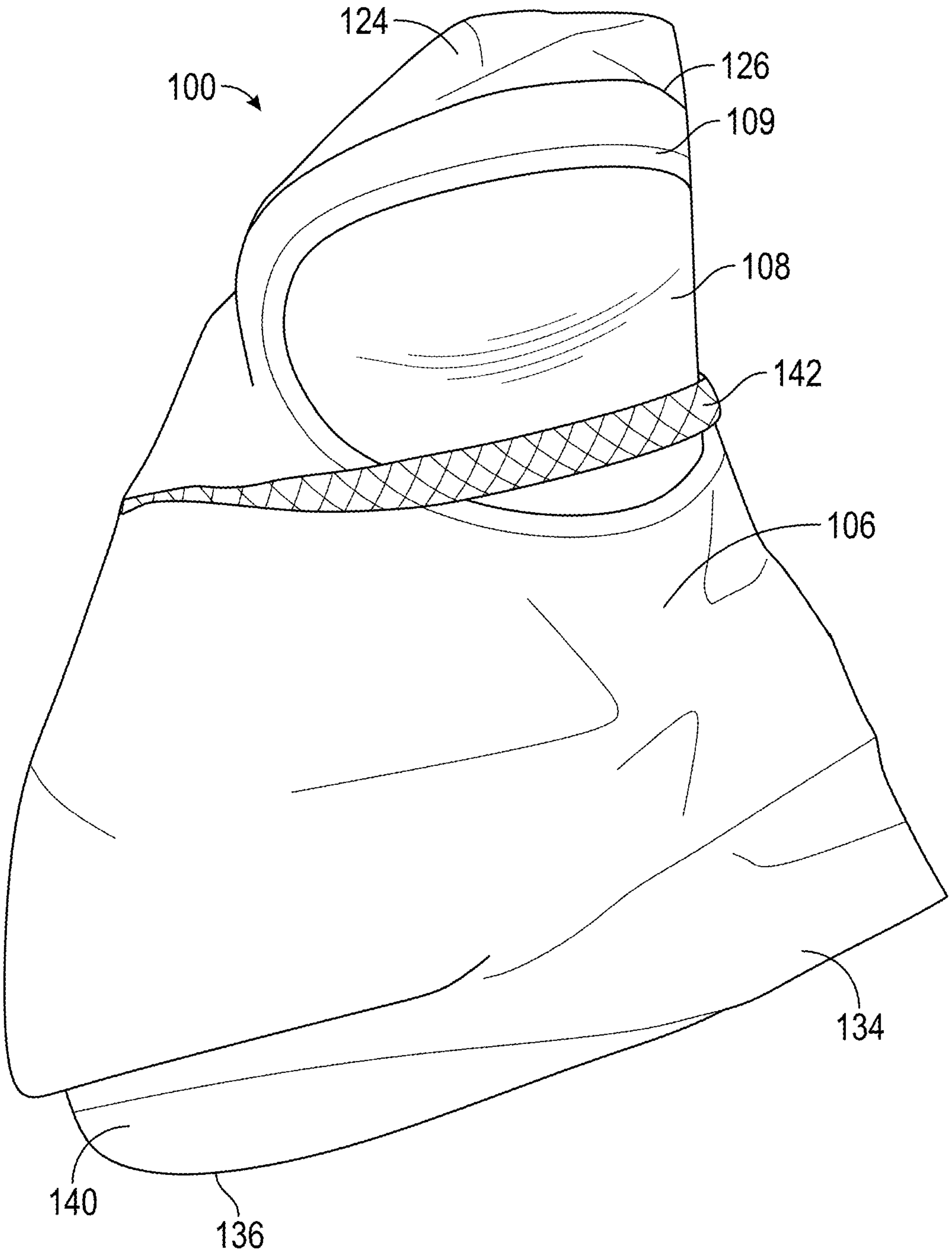
FIG. 19 is a perspective view of the hood assembly.
Figure 20:
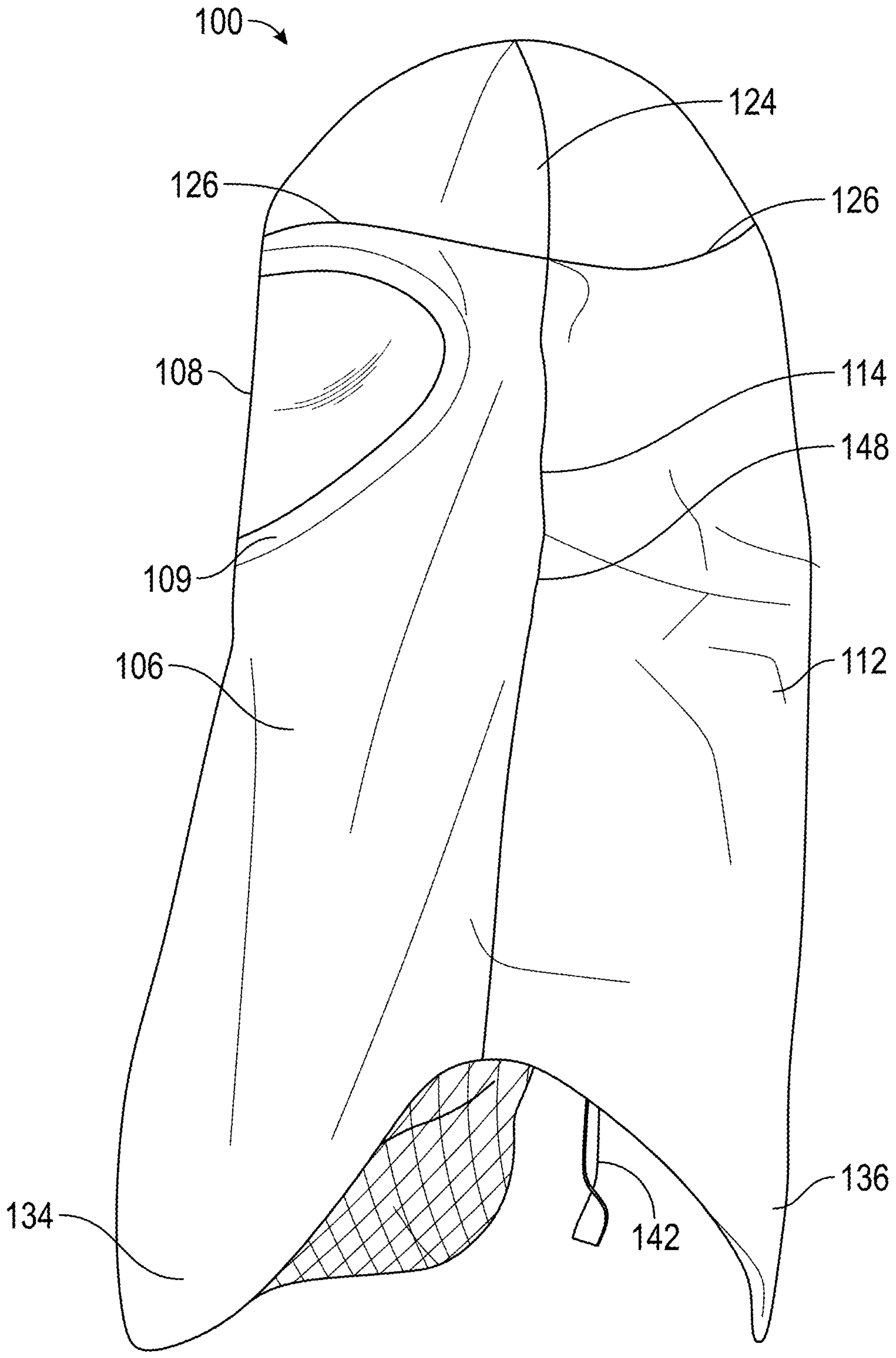
FIG. 20 is a left side view of the hood assembly.
Figure 21:
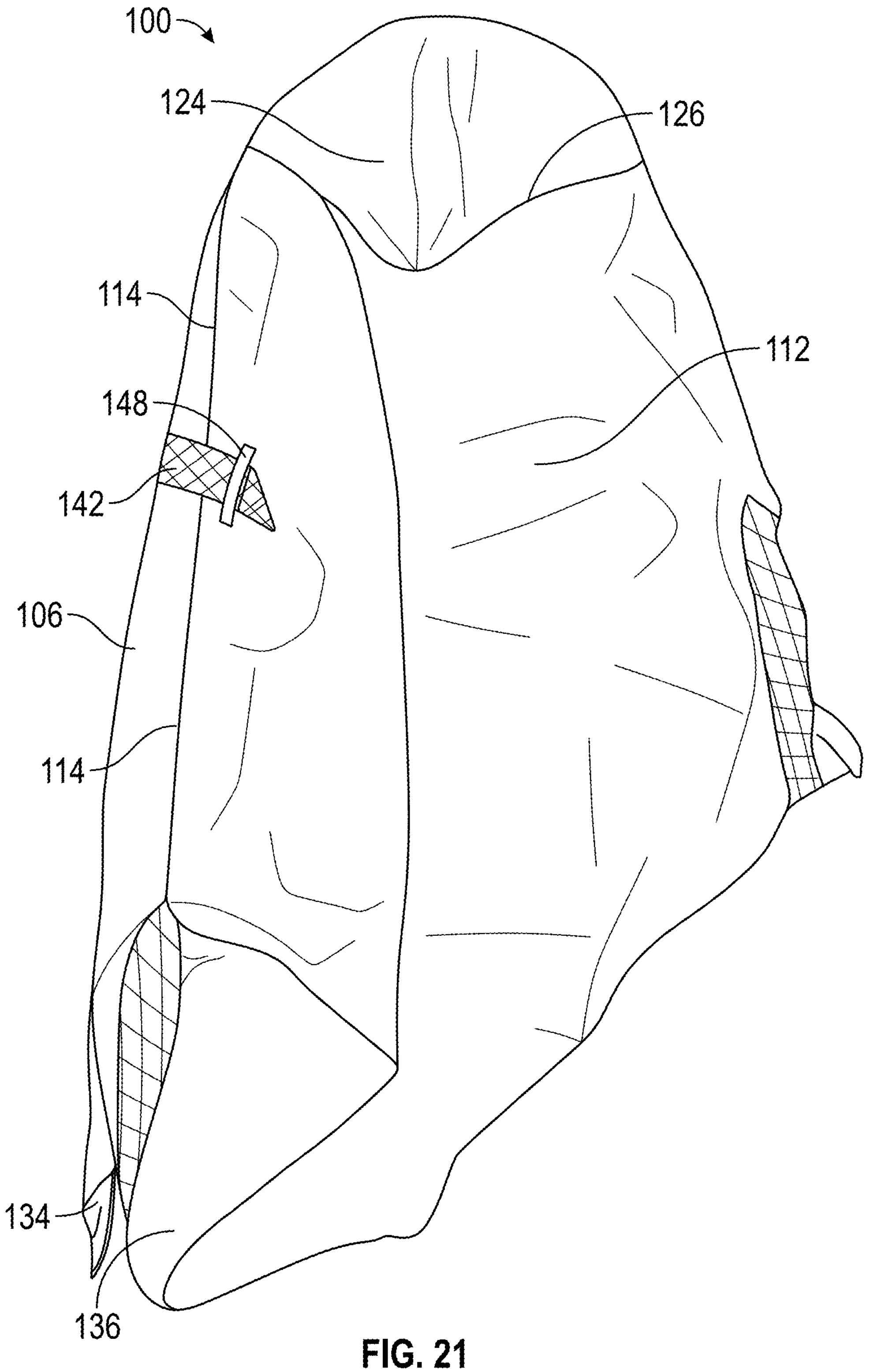
FIG. 21 is view of the sheet material of the back of the hood assembly, according to an embodiment of the present disclosure.
Figure 22:
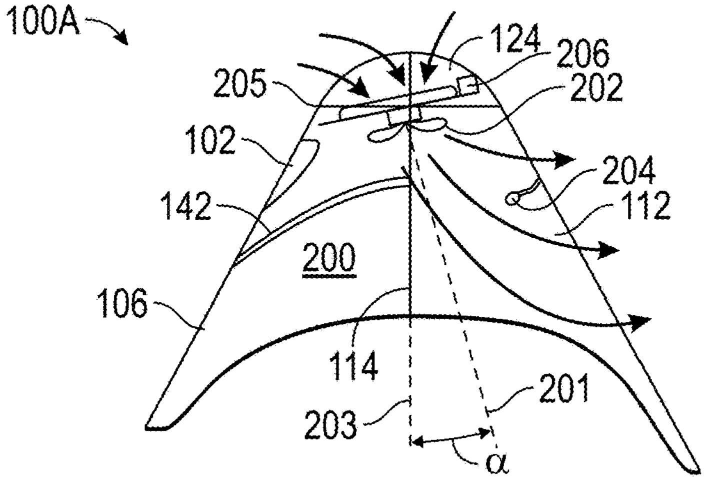
FIG. 22 is a side view of a hood assembly, according to an embodiment of the present disclosure.

Turning to FIGS. 16-18, a hook 509, configured to be carried on a helmet or head support 16 (FIG. 18), includes a proximal hole 559 configured to attach the hook 509 to the head support 16. The hook 509 may be configured to snap onto a fastener on the head support 16, or screw onto a fastener on the head support 16, or slide onto a fastener on the head support 16, or be adhesively or epoxy bonded to the head support 16. The hook 509 allows a facial shield 518 to be removably secured to the head support 16. Holes 512, 514, 516 are carried on an upper portion 28 of the facial shield 518, opposite a lower extremity 26. The facial shield has a left side 513 and a right side 511. The hook 509 comprises a circular shape having a first circular section 555 having a diameter that is less than a maximum gap $g_1$ of a first section 501 of hole 512. Hook 509 further comprises a second circular section 557 having a diameter that is less than a gap $g_3$ of a second section 503 of hole 512. The diameter of the first circular section 555 is greater than the gap $g_3$ of the second section 503 of hole 512. Thus, the hook 509 maintains locking/unlocking functionality with the hole 512 of the facial shield 518. Holes 514, 516, each having a width $W_3$ and a gap $g_2$, are configured to lock to lateral or side hooks (not shown) of the head support 16, once the hole 512 is locked to the hook 509, the locking of which thereby orients the holes 514, 516 over the lateral or side hooks. In some embodiments, the lateral or side hooks may be configured to engage against a lower edge 548 of a hole 514 (and/or an upper edge). Other embodiments of holes and hooks may be utilized, such as those described in co-owned International Application Pub. No. WO2021/183984 A1 to PABBAN DEVELOPMENT, INC. et al., published Sep. 16, 2021, which is hereby incorporated by reference in its entirety for all purposes.

The flow of air within the interior of the hood assembly 100 can be optimized a number of ways. FIGS. 22-27 illustrate six different embodiments of a hood assembly 100A-F, respectively, wherein at least a portion of the posterior sheet 112 serves as an outflow filter, to filter the outflow of air from the interior 200 of the hood assembly 100A-F. "(200)" is intended to represent the interior, inside the anterior sheet 106 and the posterior sheet 112. In some embodiments, only a portion of the posterior sheet 112 is filter material. In some embodiments, substantially all of the posterior sheet 112 is filter material. FIGS. 22-27 are shown without being placed on a user, and thus not in the con figuration of use with the tie 142 tied to enclose the internal space. Hood assembly 100A in FIG. 22 comprises a fan 202 carried below the inlet filter 124 configured to pull air (arrows) in through the inlet filter 124 to filter and trap incoming undesired particles or vectors from entering, such as potentially infecting virus or bacteria. Though the word "fan" is used here, any sort of blower or air mover, can be used if an equivalent or acceptable performance can be reached. The orientation of the fan 202 is at least partially angled posteriorly to effectively force the air out the posterior sheet 112. For example, the angle of a fan central axis 201 with a vertical axis 203 of the hood assembly 100A may be between about 0.5° and about 70°, or between about 5° and about 60°, or between about 10° and about 55°, or between about 10° and about 45°. In some embodiments, the entirety of the posterior sheet 112 is configured to filter exiting air (arrows), to protect others personnel, or subjects in general, from vectors from an infected user wearing the hood assembly 100A. In some embodiments, only a portion of the posterior sheet 112 is filter material. In some embodiments, substantially all of the posterior sheet 112 is filter material. In some embodiments, though not required, a sensor 204 is configured to measure an internal characteristic, such as air pressure, air velocity, or air temperature. A controller 206 may be carried by the fan 202 or carried by a head support 205 (optional) that also carries the fan 202. The controller 206 may be configured to receive data from the sensor 204, indicative of the internal characteristic, and to adjust the speed of the fan 202 (accelerating the speed, decelerating the speed, switching off (e.g., decreasing to a rotational speed of 0 rpm), switching on) in order to adjust the internal characteristic toward a more desirable value or state.

Figure 23:
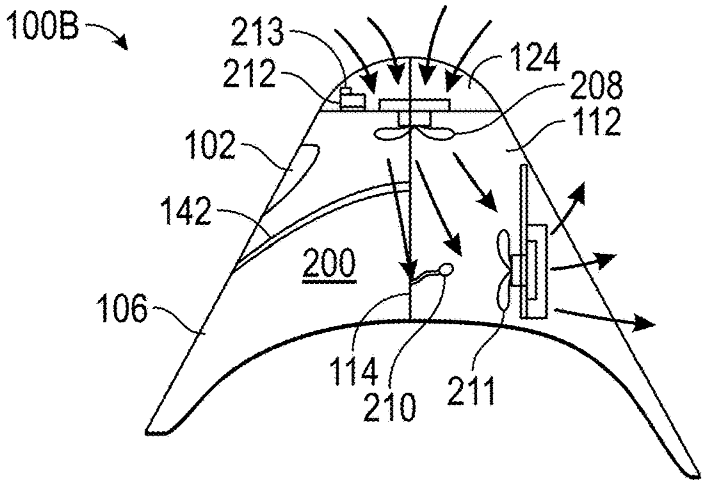
FIG. 23 is a side view of a hood assembly, according to an embodiment of the present disclosure.

Hood assembly 100B in FIG. 23 comprises a fan 208 carried below the inlet filter 124 configured to pull air (arrows) in through the inlet filter 124 to filter and trap incoming undesired particles or vectors from entering, such as potentially infecting virus or bacteria. The fan 208 is oriented substantially along a vertical axis, but in other embodiments may be at least partially angled posteriorly, as described in relation to the hood assembly 100A of FIG. 22. In some embodiments, the entirety of the posterior sheet 112 is configured to filter exiting air (arrows), to protect others personnel, or subjects in general, from vectors from an infected user wearing the hood assembly 100B. In some embodiments, only a portion of the posterior sheet 112 is filter material. In some embodiments, substantially all of the posterior sheet 112 is filter material. In this embodiment, a second fan 211 is carried by the posterior sheet 112 or by another element. The second fan 211 is configured to aid in pushing the internal air out through the posterior sheet 112. In some embodiments, though not required, a sensor 210 is configured to measure an internal characteristic, such as air pressure, air velocity, or air temperature. A controller 212 may be carried by the fan 208 or carried by a head support (as in the hood assembly 100A of FIG. 22) that also carries the fan 208. The controller 212 may be configured to receive data from the sensor 210, indicative of the internal characteristic, and to adjust the speed of the fan 208 (accelerating the speed, decelerating the speed, switching off, switching on) and/or of the second fan 211 (accelerating the speed, decelerating the speed, switching off, switching on) in order to adjust the internal characteristic toward a more desirable value or state. For example, if an internal pressure has increased to an undesirable level (e.g., above a present threshold stored in a memory 213 associated with the controller 212), the controller 212 may cause the fan 208 to slow or stop, may cause the second fan 211 to speed up or start (if not currently running), or may cause both. In some embodiments, the controller 212 may control a ratio between the speed of the fan 208 and speed of the second fan 211. In some embodiments, the controller 212 may control a differential between the speed of the fan 208 and the speed of the second fan 211. In some embodiments, the controller 212 may control a ratio between the current delivered to the fan 208 and the current delivered to the second fan 211. In some embodiments, the controller 212 may control a differential between the current delivered to the fan 208 and the current delivered to the second fan 211.

Figure 24:
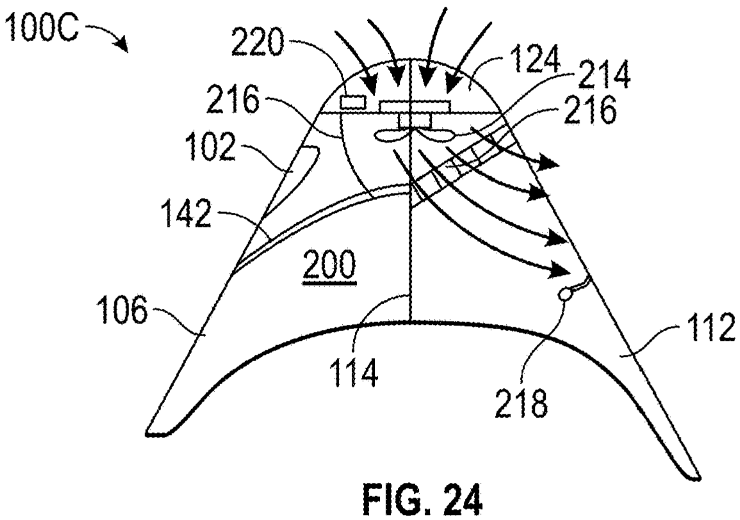
FIG. 24 is a side view of a hood assembly, according to an embodiment of the present disclosure.

Hood assembly 100C in FIG. 24 comprises a fan 214 carried below the inlet filter 124 configured to pull air (arrows) in through the inlet filter 124 to filter and trap incoming undesired particles or vectors from entering, such as potentially infecting virus or bacteria. The fan 214 is oriented substantially in a vertical axis, but in other embodiments may be at least partially angled posteriorly. Attached to a head support or other element, is a series of air baffles or channels 216 configured to aim or channel the air that has been pulled into the interior 200 by the fan 214 toward the posterior sheet 112. In some embodiments, only a portion of the posterior sheet 112 is filter material. In some embodiments, substantially all of the posterior sheet 112 is filter material. In some embodiments, in which only a portion of the posterior sheet 112 is filter material, the baffles/channels 216 may be configured to aim or channel the air toward that portion. The baffles or channels 216 may be formed by a material that has a low air permeability and/or a material that is substantially flexible. In some embodiments, each baffle or channel 216 has a larger length than width. In some embodiments, each baffle or channel has a larger width than length. In some embodiments, some baffles have a width to length ratio less than 1.0, while other baffles have a width to length ratio greater than 1.0. In some embodiments, the entirety of the posterior sheet 112 is configured to filter exiting air (arrows), to protect others from vectors from an infected user wearing the hood assembly 100C. In some embodiments, though not required, a sensor 218 is configured to measure an internal characteristic, such as air pressure, air velocity, or air temperature. A controller 220 may be carried by the fan 214 or carried by a head support (as in the hood assembly 100A of FIG. 22) that also carries the fan 214. The controller 220 may be configured to receive data from the sensor 218, indicative of the internal characteristic, and to adjust the speed of the fan 214 (accelerating the speed, decelerating the speed, switching off, switching on) in order to adjust the internal characteristic toward a more desirable value or state. In some embodiments, the hood material can be pleated, or formed in a similar manner, in order to directly provide one or more of the channels. The material forming the channel may be substantially impermeable, but may also comprise fabric with some amount of permeability (E.g., low permeability material).

Figure 25:
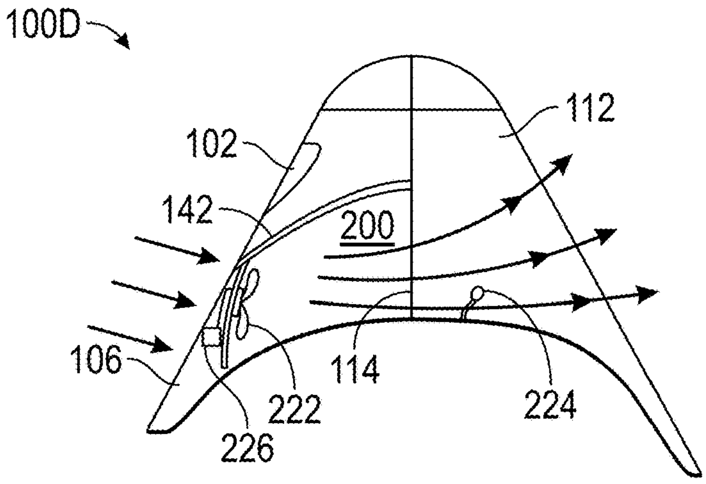
FIG. 25 is a side view of a hood assembly, according to an embodiment of the present disclosure.

Hood assembly 100D in FIG. 25 comprises a fan 222 carried adjacent the anterior sheet 106 and configured to pull air (arrows) in through filter material of the anterior sheet 106 to filter and trap incoming undesired particles or vectors from entering, such as potentially infecting virus or bacteria. In some embodiments, a head-carried inlet filter 124 (as in FIGS. 22-24) may be adjunctively used, but anterior sheet 106 may comprise the only filter material used for filtering entering air. The fan 222 is oriented substantially in a horizontal axis, but in other embodiments may be at least partially angled in other directions. For example, the angle of the fan 222 with the horizontal axis may be between about 0.5° and about 60°, or between about 10° and about 55°, or between about 10° and about 45° (positive or negative). In some embodiments, the entirety of the posterior sheet 112 is configured to filter exiting air (arrows), to protect others from vectors from an infected user. In some embodiments, only a portion of the posterior sheet 112 is filter material. In some embodiments, substantially all of the posterior sheet 112 is filter material. In some embodiments, though not required, a sensor 224 is configured to measure an internal characteristic, such as air pressure, air velocity, or air temperature. A controller 226 may be carried by the fan 222 or carried by another element that also carries the fan 222. The controller 226 may be configured to receive data from the sensor 224, indicative of the internal characteristic, and to adjust the speed of the fan 222 (accelerating the speed, decelerating the speed, switching off, switching on) in order to adjust the internal characteristic toward a more desirable value or state. For example, increasing outflow can reduce the internal (positive) pressure, but can also lower the internal temperature (for better comfort). In FIG. 25, the fan 222 is directed substantially toward the posterior, substantially along a horizontal axis, but in other embodiments, the fan 222 may be oriented in a manner that it is directed toward a superior (up) location, e.g., toward a higher portion in the hood assembly 100D. Thus, the air flow can be directed upward, prior to it being directed back (and out).

Figure 26:
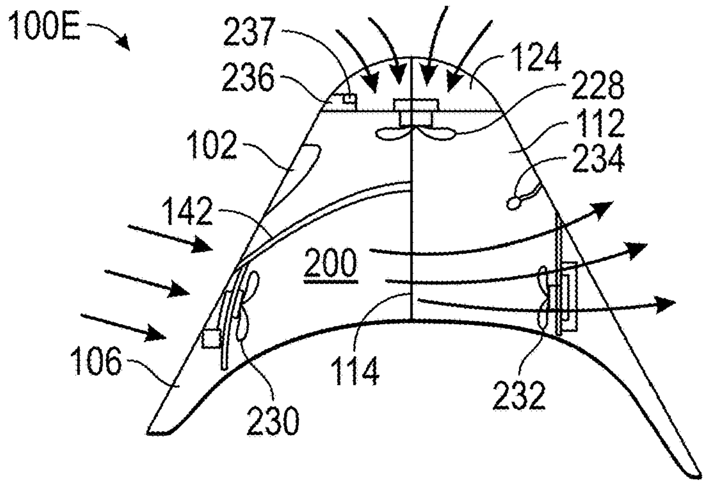
FIG. 26 is a side view of a hood assembly, according to an embodiment of the present disclosure.

Hood assembly 100E in FIG. 26 comprises a fan 228 carried below the inlet filter 124 configured to pull air (arrows) in through the inlet filter 124 to filter and trap incoming undesired particles or vectors from entering, such as potentially infecting virus or bacteria. The fan 228 is oriented substantially in a vertical axis, but in other embodiments may be at least partially angled posteriorly, as described in relation to the hood assembly 100A of FIG. 22. A second fan 230 carried adjacent the anterior sheet 106 and configured to pull air (arrows) in through filter material of the anterior sheet 106 to filter and trap incoming undesired particles or vectors from entering, such as potentially infecting virus or bacteria. The second fan 230 is oriented substantially in a horizontal axis, but in other embodiments may be at least partially angled in other directions, as described in relation to the hood assembly 100D of FIG. 25. In some embodiments, the entirety of the posterior sheet 112 is configured to filter exiting air (arrows), to protect others from vectors from an infected user. In some embodiments, only a portion of the posterior sheet 112 is filter material. In some embodiments, substantially all of the posterior sheet 112 is filter material. In this embodiment, a third fan 232 is carried by the posterior sheet 112 or by another element. The third fan 232 is configured to aid in pushing the internal air out through the posterior sheet 112. In some embodiments, though not required, a sensor 234 is configured to measure an internal characteristic, such as air pressure, air velocity, or air temperature. A controller 236 may be carried by the fan 228 or carried by a head support that also carries the fan 228, or by one of the other fans. The controller 236 may be configured to receive data from the sensor 234, indicative of the internal characteristic, and to adjust the speed of the fan 228, the second fan 230, and/or of the third fan 232 (accelerating the speed, decelerating the speed, switching off, switching on of any one or more of the fans, in any combination, positive or negative) in order to adjust the internal characteristic toward a more desirable value or state. For example, if an internal pressure has increased to an undesirable level (e.g., above a present threshold stored in memory 237 of the controller 236), the controller 236 may cause the fan 228 to slow or stop, may cause the second fan 230 to slow or stop, may cause the third fan 232 to speed up or start (if not currently running) or may cause any combination of these actions. In FIG. 26, the fan 228 is directed substantially toward the posterior, substantially along a horizontal axis, but in other embodiments, the fan 228 may be oriented in a manner that it is directed toward a superior (up) location, e.g., toward a higher portion in the hood assembly 100E. Thus, the air flow can be directed upward, prior to it being directed back (and out)

Figure 27:
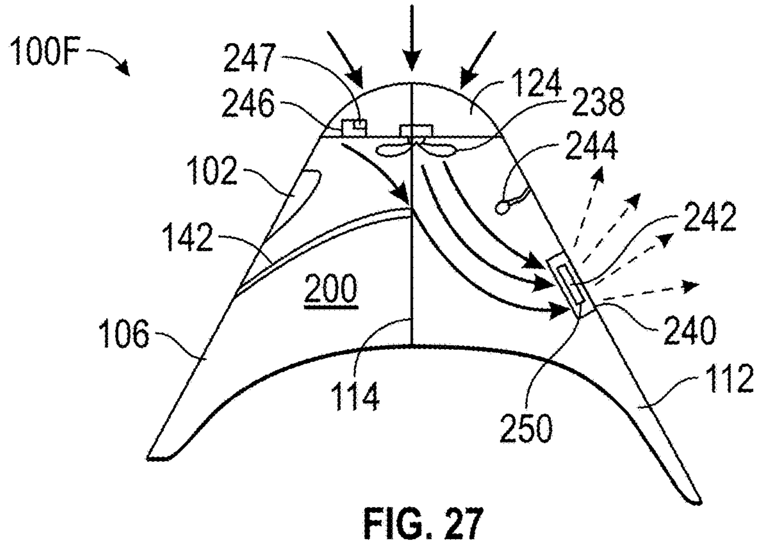
FIG. 27 is a side view of a hood assembly, according to an embodiment of the present disclosure.

Hood assembly 100F in FIG. 27 comprises a fan 238 carried below the inlet filter 124 configured to pull air (arrows) in through the inlet filter 124 to filter and trap incoming undesired particles or vectors from entering, such as potentially infecting virus or bacteria. The fan 238 is oriented substantially in a vertical axis, but in other embodiments may be at least partially angled posteriorly, as described in relation to the hood assembly 100A of FIG. 22. In some embodiments, at least some of the posterior sheet 112 may configured to filter exiting air (arrows), to protect others from vectors from an infected user, however, in the embodiment shown in FIG. 27, the posterior sheet 112 is not configured to significantly allow the passage of air therethrough. Instead, an adjustable outlet orifice 240 having a filter 242 is provided in the posterior sheet 112. The orifice 240 is adjustable to aid in controlling the amount of internal air exiting out through the posterior sheet 112. In some embodiments, though not required, a sensor 244 is configured to measure an internal characteristic, such as air pressure, air velocity, or air temperature. A controller 246 may be carried by the fan 238 or carried by a head support that also carries the fan 238. The controller 246 may be configured to receive data from the sensor 244, indicative of the internal characteristic, and to adjust the speed of the fan 248 (accelerating the speed, decelerating the speed, switching off, switching on) in order to adjust the internal characteristic toward a more desirable value or state. For example, if an internal pressure has increased to an undesirable level (e.g., above a present threshold stored in memory 247 of the controller 246), the controller 246 may cause the fan 238 to slow or stop.

The adjustable orifice 240 may include an internal openable/closable aperture 250 that is configured to be controlled by the controller 246. The controller 246 may be configured to receive data from the sensor 244, indicative of the internal characteristic, and to adjust the size of the aperture 250 in order to allow more or less air to exit through the filter 242 during a particular time period thus changing the exit flow rate). The controller 246 may also be configured to adjust the overall flow resistance of the orifice 240. This may be done by adjusting the aperture 250, but may also be done by changing the geometry or surface shape of the orifice 240. For example, increasing the length of the orifice 240 can increase flow resistance; decreasing at least some of the diameter (e.g., pinching or compressing a portion) can increase flow resistance; causing the internal surface to have a wavy or micro-wavy shape can increase flow resistance. In some embodiments, the orifice 240 may comprise an internal adjustable flow baffle, to allow the adjustment of flow resistance.

In some embodiments, the adjustment of one of more fans may occur along with the adjustment of one or more orifices. In some embodiments, an adjustable inflow orifice may be controllable. In some embodiments, the internal characteristic measured by the sensor 244 may be interpreted more for adjusting or controlling the laminarity of the flow, thus to assure that no significant eddies occur and that substantially all air circulates through the system pathway(s). In some embodiments, the grooves, troughs, or channels may be a first element to optimize laminarity, and any of the adjustable elements may be a second element to optimize laminarity. In some embodiments, other elements may have shaped portions, such as baffles or channels. For example, a chin bar configured to extend around the chin of a user may have the baffles, deflectors, or channels.

In some embodiments, the anterior sheet 106 may comprise one layer, or two layers, or more than two layers. In some embodiments, the posterior sheet 112 may comprise one layer, or two layers, or more than two layers. In some embodiments, the anterior sheet 106 may comprise a first filter media and the posterior sheet 112 may comprise a second filter media. In some embodiments, the anterior sheet 106 may comprise a first filter media having a first filtration efficiency and the posterior sheet 112 may comprise a second filter media having a second filtration efficiency, different from the first filtration efficiency. In some embodiments, the filtration efficiency may comprise particle filtration efficiency (PFE). In some embodiments, the filtration efficiency may comprise viral filtration efficiency (VFE). In some embodiments, the filtration efficiency may comprise bacteria filtration efficiency (BFE). In some embodiments, the second filter media is configured to have a lower efficiency than the first filter media. In some embodiments, the first filter media has a grammage of between about 20 $g/m^2$ and about 250 $g/m^2$. In some embodiments, the first filter media has a grammage of between about 30 $g/m^2$ and about 250 $g/m^2$. In some embodiments, the first filter media has a grammage of between about 30 $g/m^2$ and about 200 $g/m^2$. In some embodiments, the second filter media has a grammage of between about 20 $g/m^2$ and about 600 $g/m^2$. In some embodiments, the second filter media has a grammage of between about 20 $g/m^2$ and about 500 $g/m^2$. In some embodiments, the second filter media has a grammage of between about 20 $g/m^2$ and about 100 $g/m^2$.

In any of the embodiments of the hood assembly 100A-F, pressure differential may be maintained, wherein the differential pressure comprises a difference between the first characteristic and an ambient pressure outside of the cover.

Figure 33:
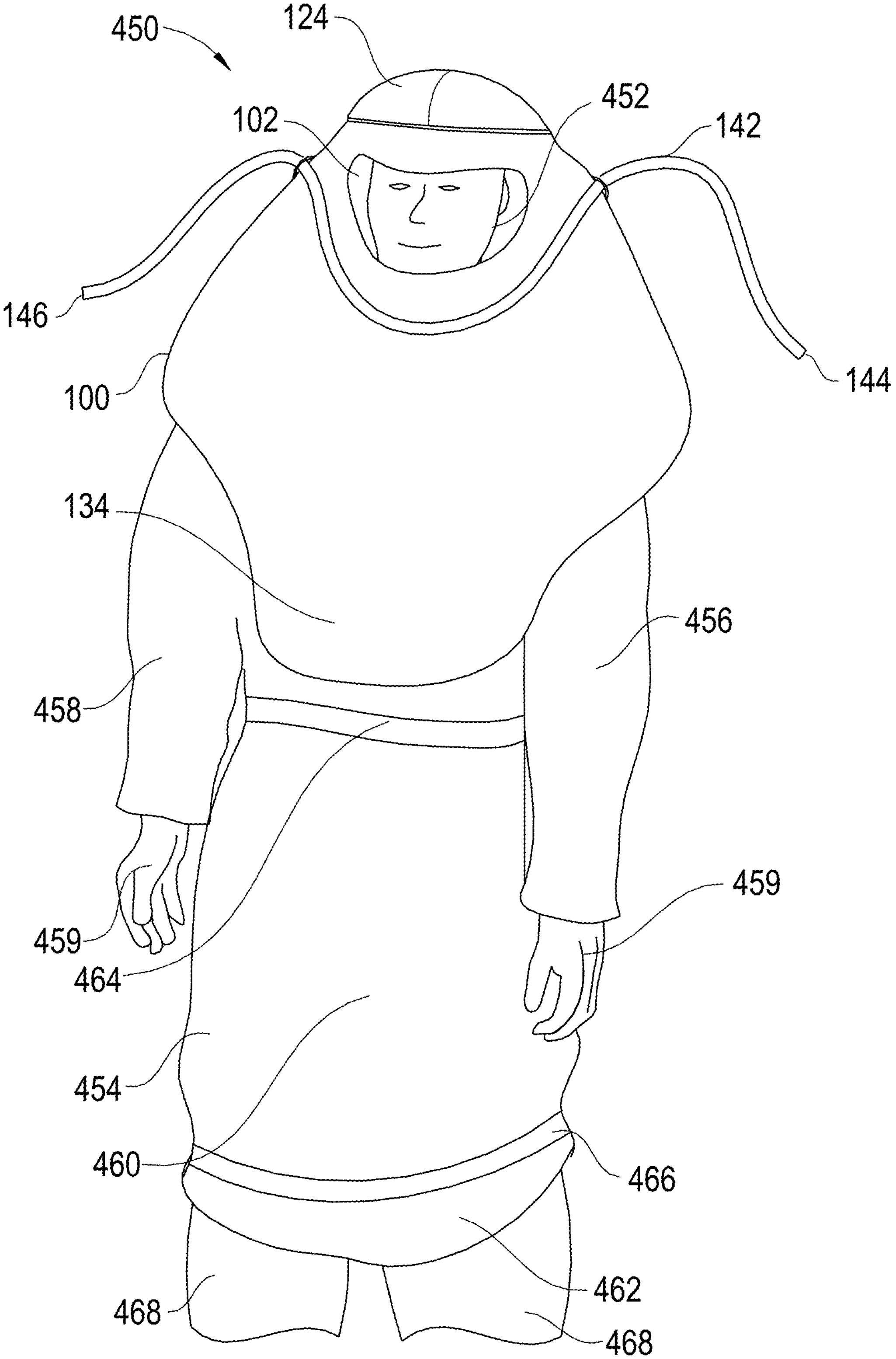
FIG. 33 is a perspective view of the hood assembly of FIGS. 1-13 in an unsecured state on a user.
Figure 34:
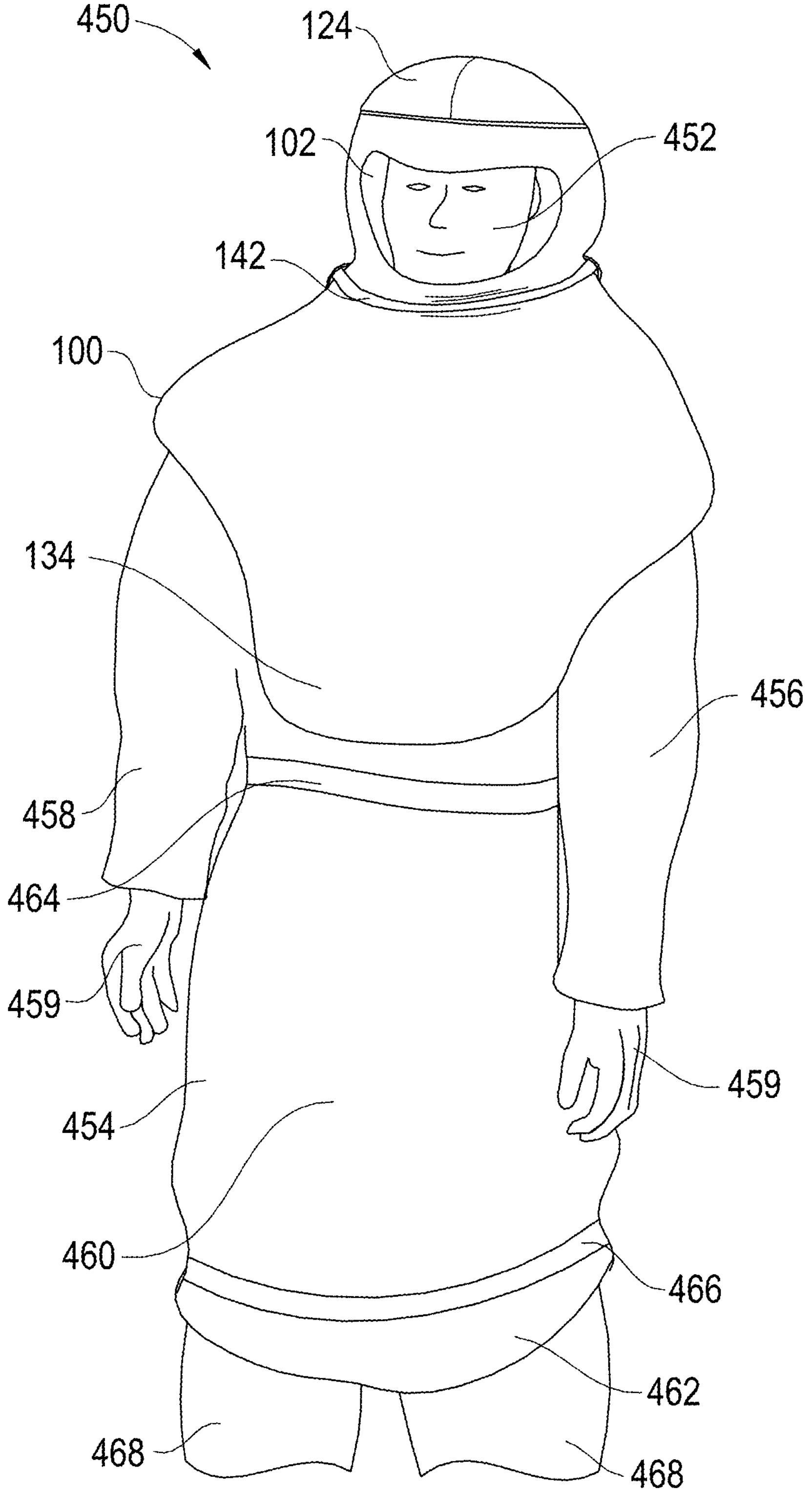
FIG. 34 is a perspective view of the hood assembly of FIG. 33 in a secured state on a user.

FIG. 33 illustrates a user 452 donning a personal protection system 450 comprising the hood assembly 100 of FIGS. 1-13 and a gown 454. The gown 454 comprises a left sleeve 456, a right sleeve 458, and a front portion 460 extending therebetween and extending between a lower end 462 and an upper end (not visible, beneath the hood assembly 100). The gown 454 may comprise a standard surgical gown and is configured to close in the back and be tied close with a tie 464. Alternatively, the gown 454 may be closed with a vertical seal in the back. An additional (optional) tie 466 is configured to close the gown 454 around an upper portion of the legs 468 of the user 452, or around the buttocks of the user 452. In laminar flow rooms (clean rooms, etc.) in which lower level (height) laminar flow layers of air are removed from the room without any significant mixing with higher level laminar flow areas (e.g., near the faces of personnel), the significant closure of the gown 454 with the tie 466 can serve to send a portion of the internal (to the system 450) air down to the lower laminar flow areas of the room. Thus, the system 450 works in conjunction with the laminar flow room. In FIG. 34, the tie 142 of the hood assembly 100 has further been tied around the neck area of the user 452. A user 452 may also wear gloves 459 over the ends (e.g., cuffs) of the sleeves 456, 458. In a room that is not a laminar flow room or is not being operated as one, the system 450 can used without the tie 466 (or with the tie 466 significantly loose).

The Applicant performed an internal outward particle reduction test on personal protection systems 450 including hood assemblies 100 having the general configuration of FIG. 34 (with a vertical seal to close the back of a level IV isolation gown), with two different configurations. A first configuration A includes the additional tie 466 closing the lower portion. A second configuration B does not have the additional tie 466. As a comparison, the test was also performed with an N95 respirator with a simulated face seal C, and with a KN95 respirator D. Ten different samples from each test group were tested (N=10). In each test, 0.1 micron to 10 micron NaCl particles were introduced through the nasal route of a soft-faced medium ISO headform (e.g., dummy) at flow rate of 85 liter per minute of an approximately 5 $mg/m^3$ concentration. For the hood assemblies 100 of the personal protection systems 450, an additional 200 liters per minute of clean air was provided to mimic the forced airflow of the powered system 450 and to provide the normal positive pressure. The values were generated by monitoring particle concentrations exiting the test chamber, with and without the test system (A, B, C, D) on the headform. Readings were taken with a TSI DustTrak DRK Aerosol Monitor. The results are shown in Table 1, below.

TABLE 1

| Test Group | N= | Description | Condition | Mean value | Standard Deviation |
|---|---|---|---|---|---|
| A | 10 | Hood with sealed back Level IV isolation gown | Lower gown tie tied* | 97.6% | 1.4% |
| B | 10 | Hood with sealed back Level IV isolation gown | No Lower gown tie | 83.3% | 11.1% |
| C | 10 | 3M Aura N95 respirator mask with simulated | N/A | 97.2% | 0.7% |

TABLE 1-continued

| Test Group | N= | Description | Condition | Mean value | Standard Deviation |
|---|---|---|---|---|---|
| | | good facial seal | | | |
| D | 10 | 3M 8210 KN95 respirator mask | N/A | 62.2% | 9.7% |

Data from groups A and C were compared by performing a Student's T-Test, two-tailed. The T-test produced a p-value of 0.45, and thus the null hypothesis could not be rejected. *Air that was delivered to the lower level of the gown, which would be at a lower level in a laminar room (for removal) was isolated and was not part of the measurement. Thus, only the air that would have been significant to personnel of the room was measured in the four groups (A, B, C, D).

Figure 37:
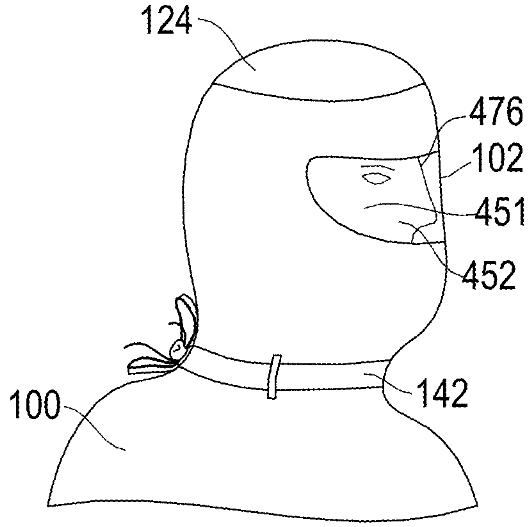
FIG. 37 is a detail view of the hood assembly of FIGS. 33-34 on the head of a user.

FIG. 37 illustrates the hood assembly in place over the head 451 of a user 452, with the tie 142 tightened around the neck of the user 452 to create an interior volume 472. A hood assembly 100*a* in FIG. 38, hood assembly 100*b* in FIG. 39, and hood assembly 100*c* in FIG. 40, each comprises a fan 470 adjacent the filter 124, configured to pull external air through the filter 124 and into the interior volume 472. The fan 470 may be powered from a local wired power source, or may be battery powered, including one or more rechargeable batteries. The inflow of the filtered air 384 flows toward the open space (space not blocked by the head 451 of the user 452), which favors its circulation path toward an open space 474 between the face 476 of the user 452 and the internal surface 478 of the facial shield 102.

Figure 38:
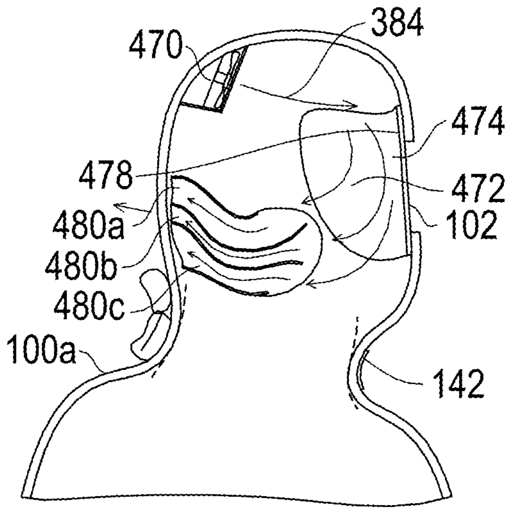
FIG. 38 is a cross-sectional view according to a first alternative embodiment of the hood assembly of FIG. 37.

In the hood assembly 100*a* of FIG. 38, a series of three channels 480*a*, 480*b*, 480*c* is carried on within each side. The channels 480 serve to guide the circulating air within the open space of the interior volume 472 toward the posterior sheet 112. The positive pressure (e.g., gauge pressure in relation to the external environment) will then cause the air to selectively exit through the posterior sheet 112 to thus filter the air. Thus, the user 452 breathes filtered air that has passed through the filter 124. Furthermore, the air exhaled by the user 452 is filtered by the posterior sheet 112 before it is returned to the external environment. Thus, both the user 452, and other personnel within the working area are protected from potential airborne vectors.

Figure 39:
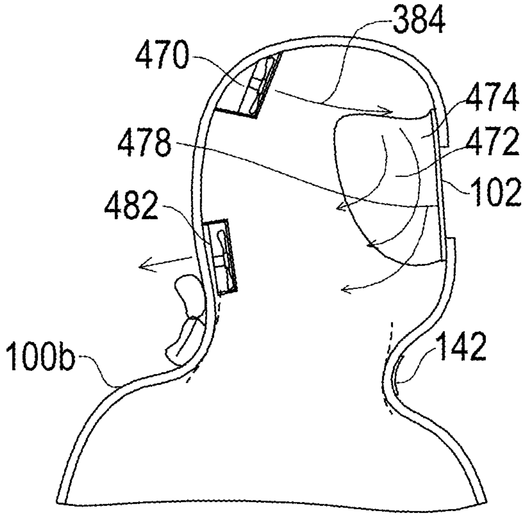
FIG. 39 is a cross-sectional view according to a second alternative embodiment of the hood assembly of FIG. 37.
Figure 40:
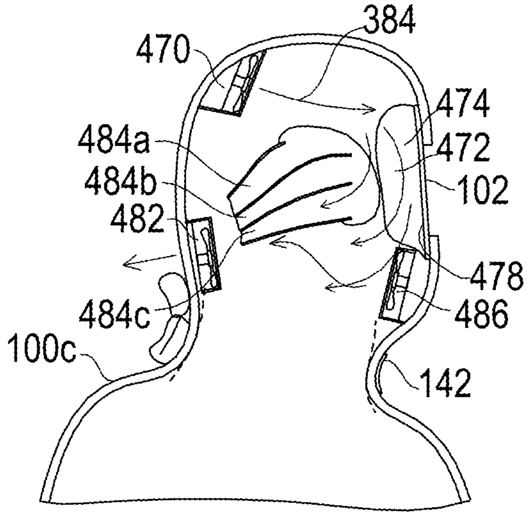
FIG. 40 is a cross-sectional view according to a third alternative embodiment of the hood assembly of FIG. 37.

The hood assembly 100*b* of FIG. 39 comprises an exit fan 482 instead of the channels 480. The hood assembly 100*c* of FIG. 40 comprises both guiding channels 484*a*, 484*b*, 484*c* and an exit fan 482. The exit fan 482 is configured to pull air from the open space 474 toward the posterior sheet 112. Positive pressure will cause the air to exit through the posterior sheet 112. The hood assembly 100*c* may also include an optional third fan 486, configured to push the air toward the guiding channels 484*a*, 484*b*, 484*c* and/or toward the exit fan 482.

Figure 30:
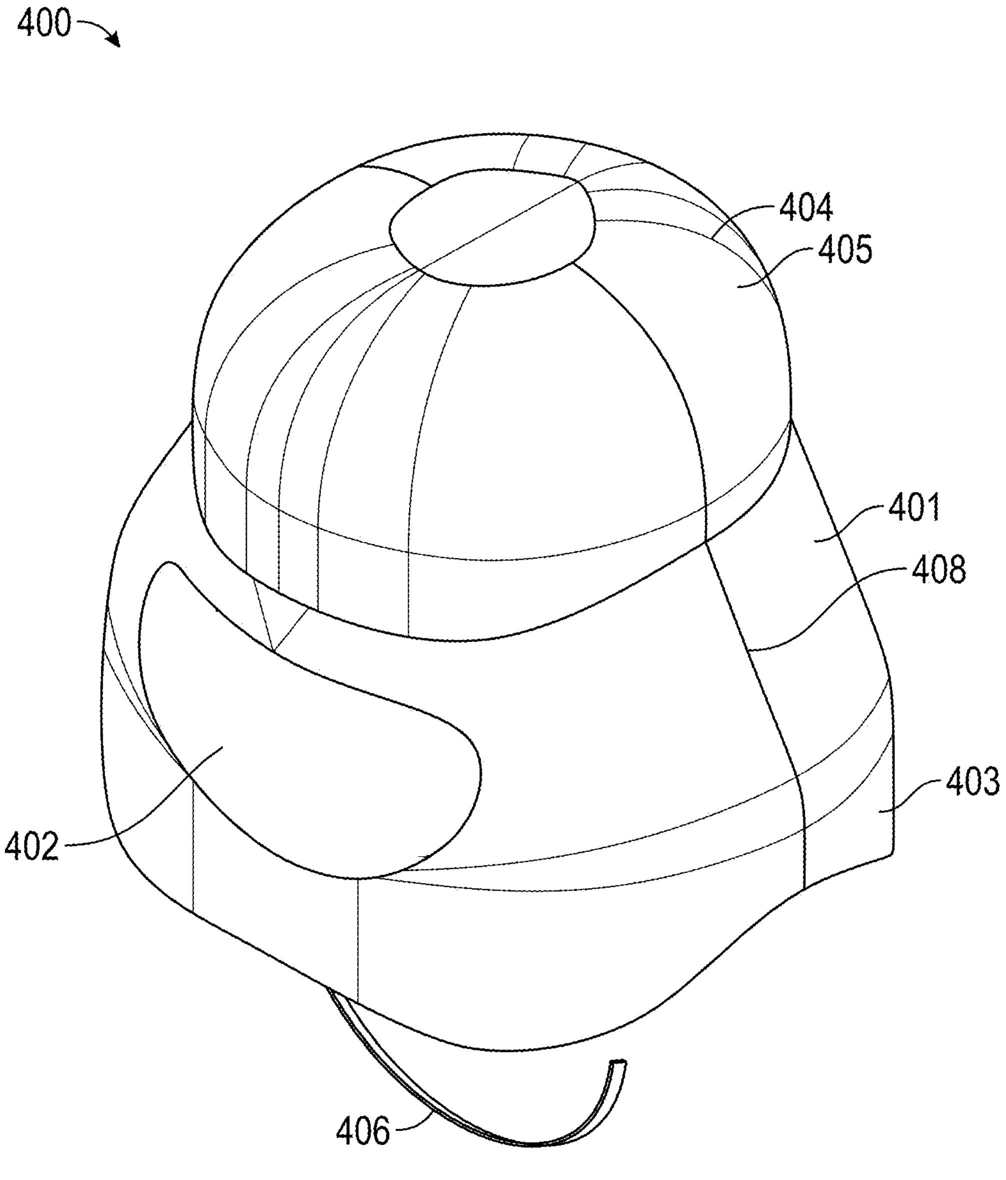
FIG. 30 is a perspective view of a second bonnet assembly, according to an embodiment of the present disclosure.

FIG. 30 illustrates a bonnet assembly 400 having similarities to the hood assembly 100. Similar materials and components may be used, with similar function and use as all of the embodiments 100A-100F, however the geometry of the worn element of the bonnet assembly 400 is different. The bonnet assembly 400 has a facial shield 402, and inlet filter 404, a bonnet body 408, and an elastic securement band 406. The bonnet body 408 includes a tapered middle portion 401 transitioning between a maximum diameter portion 403 and a top dome-shaped portion 405.

Figure 28:
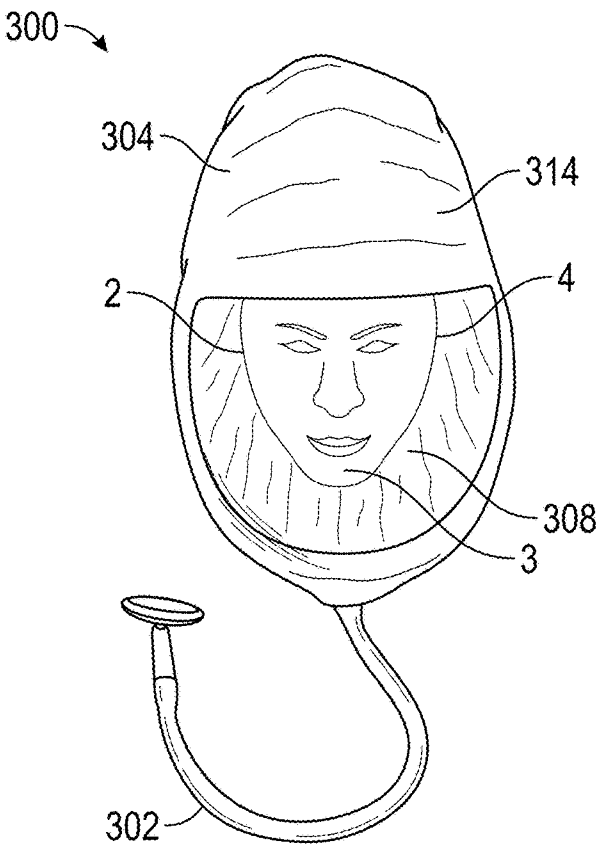
FIG. 28 is a first perspective view of a first bonnet assembly, according to an embodiment of the present disclosure.
Figure 29:
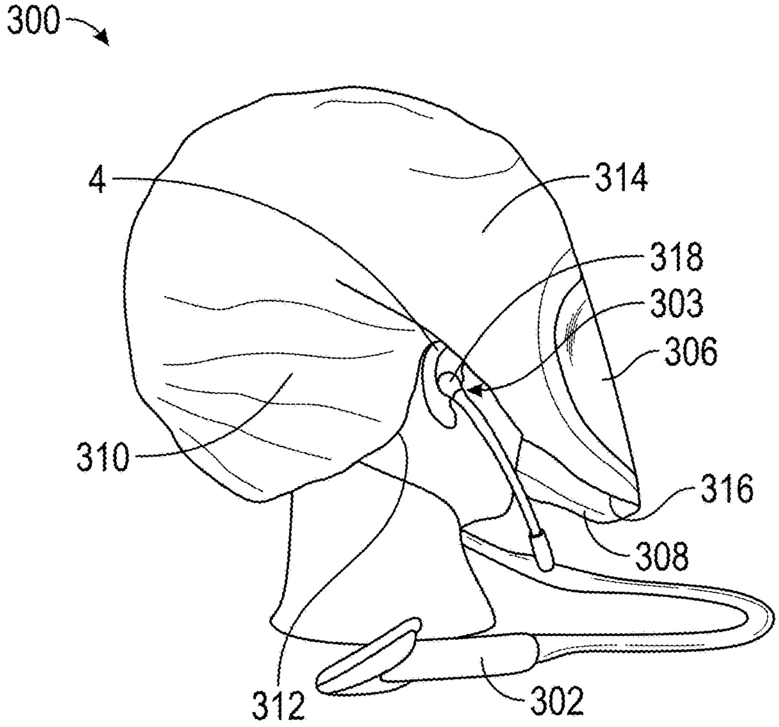
FIG. 29 is a second perspective view of the first bonnet assembly of FIG. 28.

FIGS. 28-29 illustrate a bonnet assembly 300 configured to protect a user 2 (as does the hood assembly 100), while also allowing the user 2 to be able to easily use a stethoscope 302. The bonnet assembly 300 includes a head cover 304, coupled to a facial shield 306. The head cover 304 is also coupled to a cuff 308 that is able to conform to the face 3 of the user 2. The head cover 304 includes a first portion 310 that fits around the posterior portion of the user's head and includes a substantially anterior-facing upward sweep 312 to avoid the user's ear 4. The head cover 304 also includes a second portion 314 that partially overlaps the first portion 310. The second portion 314 includes a substantially posterior-facing upward sweep 316 that fits around the lower face 3 of the user 2 to also avoid the user's ear 4. Thus, the upward sweep 312 and the upward sweep 316 together cover and protect the user 2, while allowing complete access of the user's ear 4 for the earphones 318 of the stethoscope 302. The upward sweep 312 and the upward sweep 316 together form a substantially triangular relief area 303 that leaves the internal canal of the ear 4 fully accessible while the bonnet assembly 300 is fully secured on the head of the user 2. The first portion 310 and/or the second portion 314 may in some cases at least partially cover an upper portion of the outer ear of the user 2, while still allowing full access to the internal canal of the ear 4.

In a first embodiment, the first portion 310 and the second portion 314 may be snapped to each other and unsnapped from each other with mating snaps (not shown). When unsnapped from each other, the user 2 is able to pull down the second portion 314 to partially or fully cover the ears 4, if desired. To fully cover the ears, the earphones 318 of the stethoscope 302 may first be removed from the user's ears 4. A second embodiment includes a strap or tie, instead of the snaps. The strap or tie can be tied around the second portion 314 in order to maintain it above the ears 4.

Figure 31:
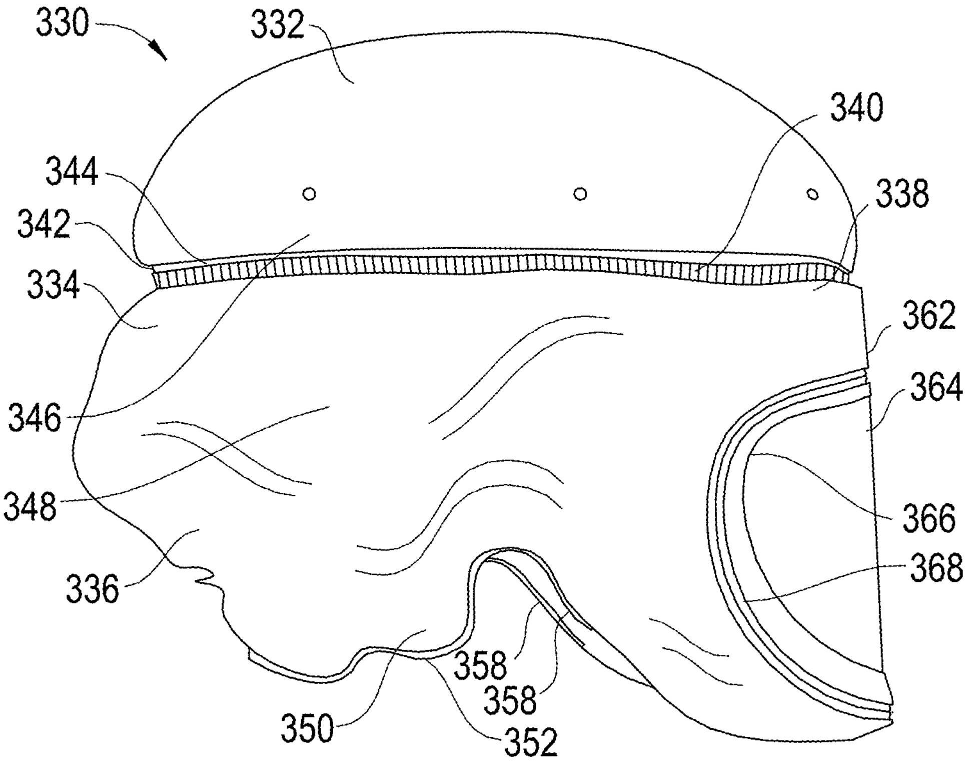
FIG. 31 is a side view of a bonnet assembly according to an embodiment of the present disclosure.
Figure 41:
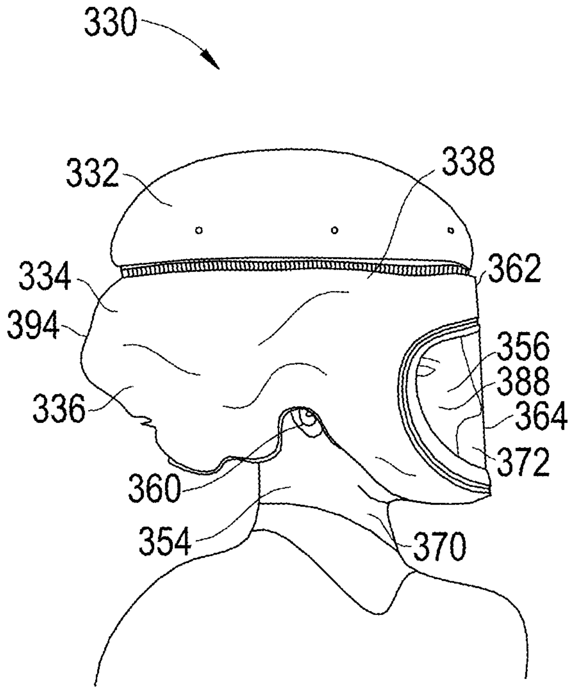
FIG. 41 is a detail view of the bonnet assembly of FIG. 35 on the head of a user.

FIG. 31 illustrates a bonnet assembly 330 for covering the head of a user. A helmet 332 is configured to cover the upper portion of the head of the user 354 (FIG. 41), and to interface with the head 356 of the user 354. A gaiter-like head covering 334 is formed of a fabric 348, including at least a portion of filtering fabric material 336. At least some of the fabric 348 may comprise impermeable or substantially impermeable material. An upper portion 338 of the head covering 334 includes an elastic ring 340 configured to snugly secure around a perimeter 342 of an undercut 344 on a lower portion 346 of the helmet 332. A lower portion 350 of the head covering 334 comprises an elastic band 352 that is configured to tightly secure around a lower portion of the head 356 of the user 354 and/or around the neck 370 of the user 354, and can be configured to cover and hold the user's hair, as seen in FIG. 41. The lower portion 350 and/or the elastic band 352 can be configured with a curvilinear portion 358 configured to clear the ears 360 of the user 354, for example, to allow access to a stethoscope, headphones, ear buds, or ear plugs.

An anterior portion 362 of the head covering 334 comprises a substantially translucent or transparent facial shield 364. The facial shield 364 may comprise a sheet comprising high clarity polymer such as polyethylene terephthalate glycol (PETG), polyethylene terephthalate (PET), or other polyesters or polyester copolymers, or acrylic, or polycarbonate, such that it can provide a relatively thin but tough barrier that does not significantly impede the vision of the user. The facial shield 364 includes a perimeter 366 that is secured to the fabric 348 of the head covering 334 at one or more seams 368. The helmet 332 and head covering 334 together are configured to tightly secure around a lower portion of the head 356 of the user 354 and/or around the neck 370 of the user 354, and create a controlled interior volume 372 within. Thus, the user 354 breathes air from within the interior volume 372. In some embodiments, the head covering 334 includes an additional cuff, similar to the cuff 616 of the hood assembly 600 in FIG. 32, or the cuff 616 of the hood assemblies 600*a*, 600*b*, 600*c* of FIGS. 46-48. In some embodiments, an inferior (lower) flow barrier is created with the lower portion 350 and/or the elastic band 352 configured to fit around a posterior portion of the user's head and an additional cuff configured to fit around an anterior portion of the user's head.

Figure 42:
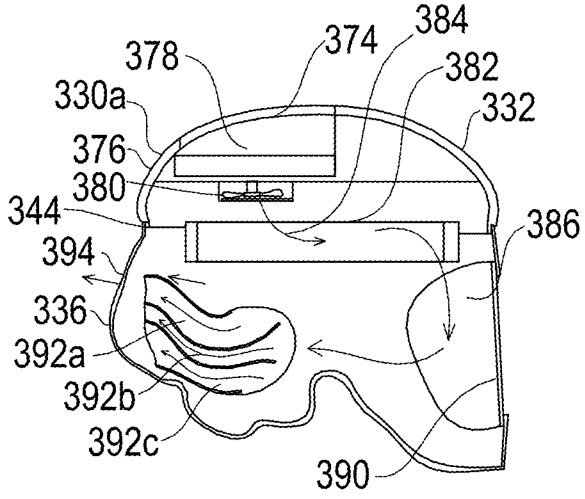
FIG. 42 is a cross-sectional view according to a first alternative embodiment of the hood assembly of FIG. 41.
Figure 43:
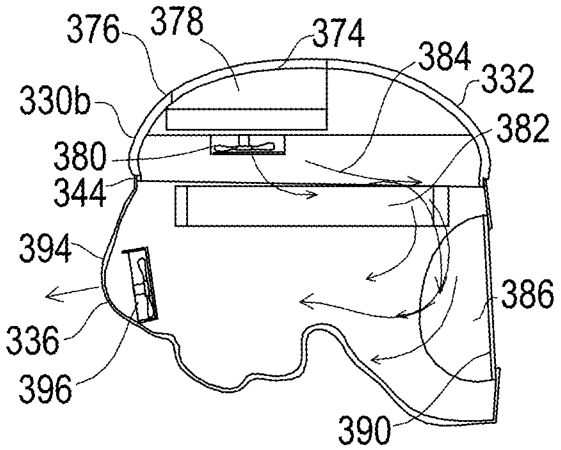
FIG. 43 is a cross-sectional view according to a second alternative embodiment of the hood assembly of FIG. 41.
Figure 44:
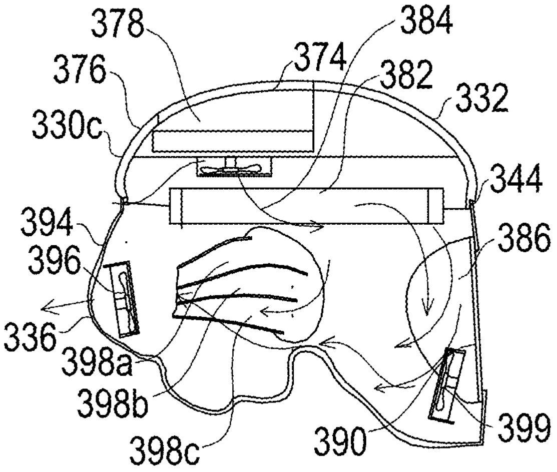
FIG. 44 is a cross-sectional view according to a third alternative embodiment of the hood assembly of FIG. 41.

A bonnet assembly 330*a* in FIG. 42, bonnet assembly 330*b* in FIG. 43, and bonnet assembly 330*c* in FIG. 44, each comprises an opening 374 in a proximal portion 376 of the helmet 332, and a filter 378 disposed adjacent and/or within the opening 374. Each also comprises a fan 380 adjacent the filter 378, configured to pull external air through the filter 378 and into the interior volume 372. The fan 380 may be powered from a local wired power source, or may be battery powered, including one or more rechargeable batteries. Each bonnet assembly 330*a*, 330*b*, 330*c* also includes a suspension band 382 for snugly holding the helmet 332 to the head 356 of the user 354. The inflow of the filtered air 384 flows toward the open space (space not blocked by the head 356 of the user 354), which favors its circulation path toward an open space 386 between the face 388 of the user 354 and the internal surface 390 of the facial shield 364.

In the bonnet assembly 330*a* of FIG. 42, a series of three channels 392*a*, 392*b*, 392*c* is carried on each side of the head covering 334. The channels 392 serve to guide the circulating air within the open space 386 toward the filtering fabric material 336 at a posterior portion 394 of the head covering 334. The positive pressure (e.g., gauge pressure in relation to the external environment) will then cause the air to selectively exit through the filtering fabric material 336 at a posterior portion 394 of the head covering 334. Thus, the user 354 breathes filtered air that has passed through the filter 378. Furthermore, the air exhaled by the user 354 is filtered by the filtering fabric material 336 before it is returned to the external environment. Thus, both the user 354, and other personnel within the working area are protected from potential airborne vectors.

The bonnet assembly 330*b* of FIG. 43 comprises an exit fan 396 instead of the channels 392. The bonnet assembly 330*c* of FIG. 44 comprises both guiding channels 398*a*, 398*b*, 398*c* and an exit fan 396. The exit fan 396 is configured to pull air from the open space 386 toward the filtering fabric material 336 at the posterior portion 394 of the head covering 334. Positive pressure will cause the air to exit through the filtering fabric material 336. The bonnet assembly 330*c* may also include an optional third fan 399, configured to push the air toward the guiding channels 398*a*, 398*b*, 398*c* and/or toward the exit fan 396.

Figure 35:
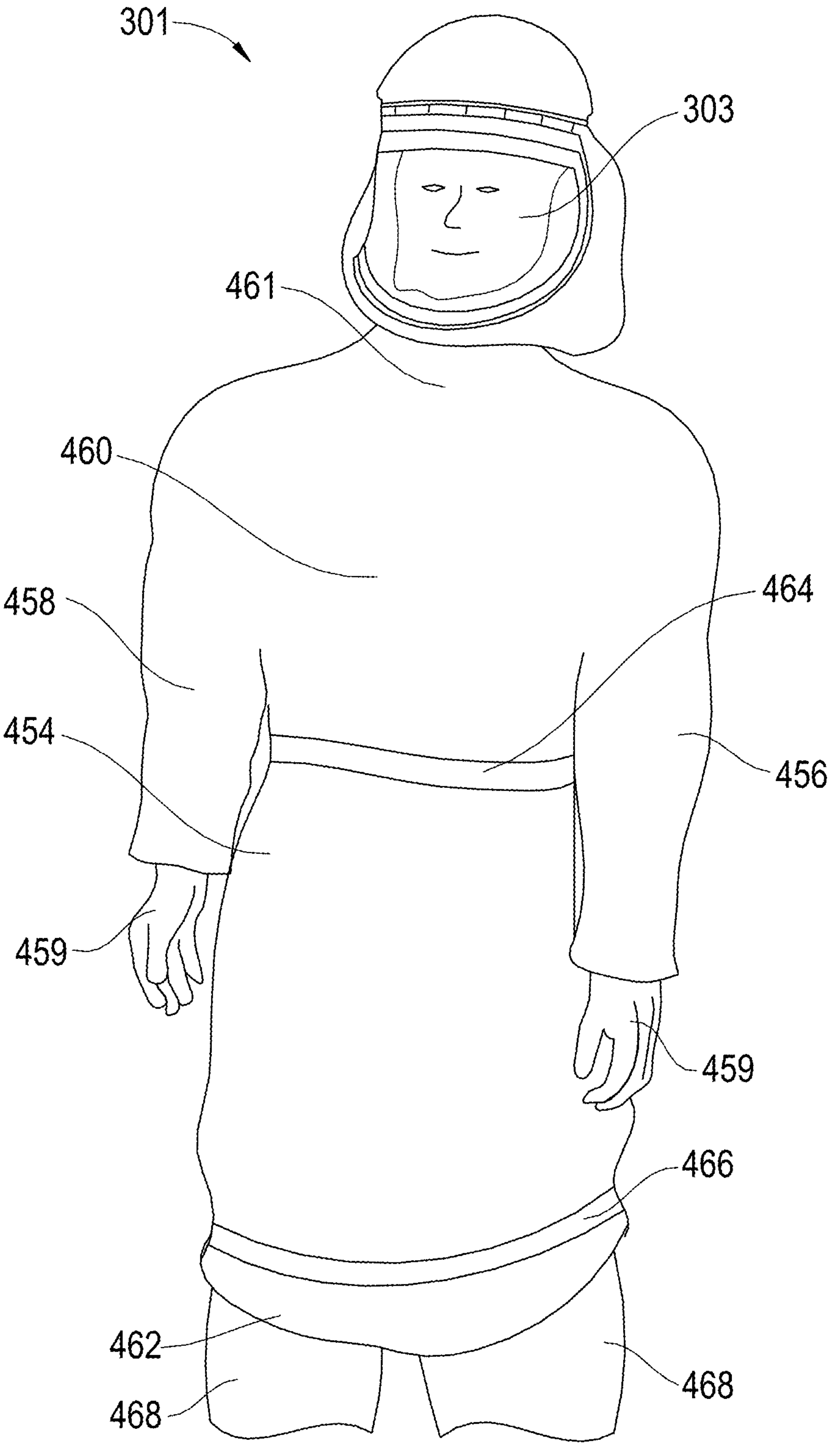
FIG. 35 is a perspective view of the bonnet assembly of FIG. 31 worn on a user.

FIG. 35 illustrates a user 303 donning a personal protection system 301 comprising the bonnet assembly 330 of FIG. 31 and a gown 454. The gown 454 comprises a left sleeve 456, a right sleeve 458, and a front portion 460 extending therebetween and extending between a lower end 462 and an upper end 461. The gown 454 may comprise a standard surgical gown and is configured to close in the back and be tied close with a tie 464. Alternatively, the gown 454 may be closed with a vertical seal in the back. An additional (optional) tie 466 is configured to close the gown 454 around an upper portion of the legs 468 of the user 303, or around the buttocks of the user 303. A user 303 may also wear gloves 459 over the ends of the sleeves 456, 458.

Figure 32:
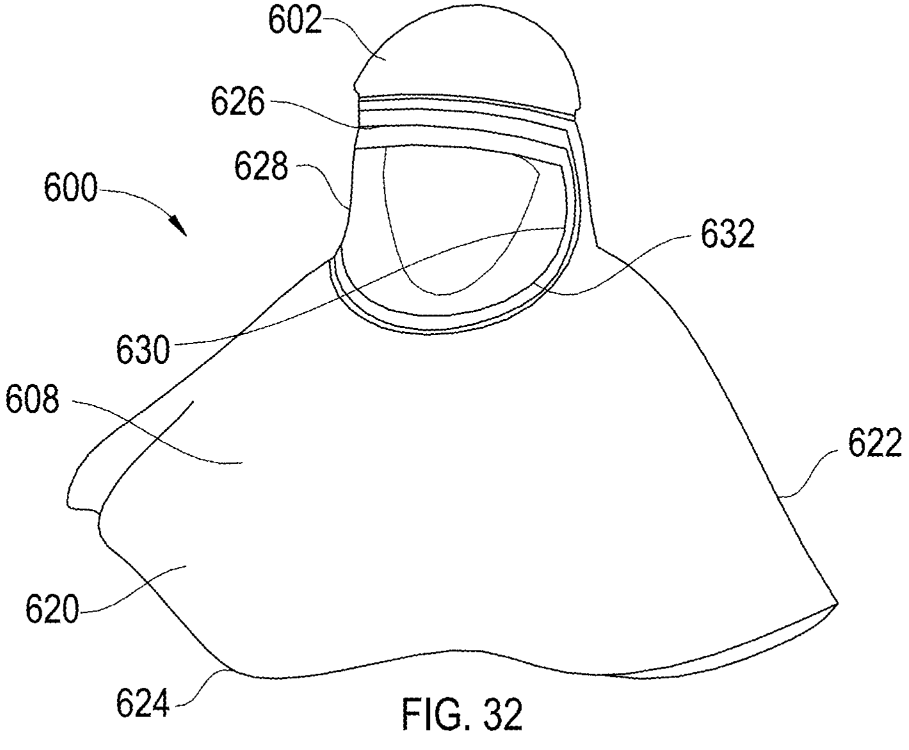
FIG. 32 is a perspective view of a hood assembly according to an embodiment of the present disclosure.
Figure 45:
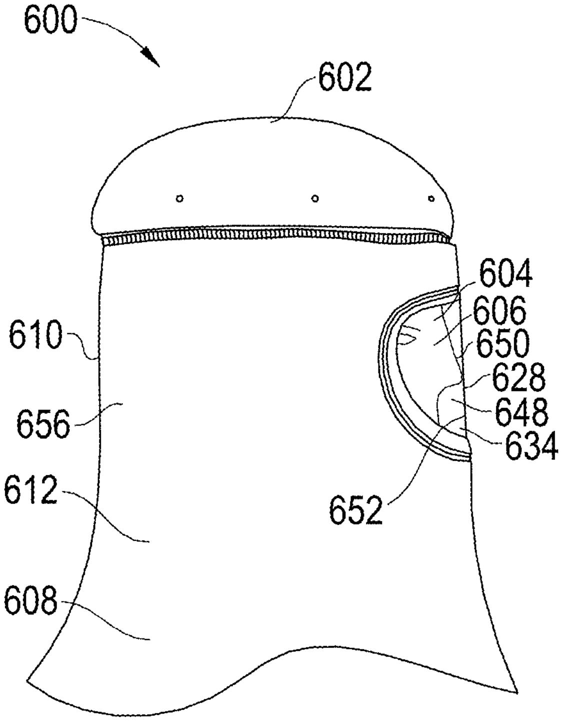
FIG. 45 is a detail view of the hood assembly of FIG. 36 on the head of a user.

FIG. 32 illustrates a hood assembly 600 for covering the head of a user. A helmet 602 is configured to cover the upper portion of the head of the user 604 (FIG. 36), and to interface with the head 606 of the user 604. A shroud 608 includes a fabric 612 having at least a portion of filtering fabric material 610 (FIG. 45). At least some of the fabric 612 may comprise impermeable or substantially impermeable material. An upper portion 614 of the shroud 608 includes an internal cuff 616 configured to snugly secure around the neck 618 of the user 604. A lower portion 620 of the comprises a flare 622 having a lower edge 624.

An anterior portion 626 of the shroud 608 comprises a substantially translucent or transparent facial shield 628. The facial shield 628 may comprise a sheet comprising high clarity polymer such as polyethylene terephthalate glycol (PETG), polyethylene terephthalate (PET), or other polyesters or polyester copolymers, or acrylic, or polycarbonate, such that it can provide a relatively thin but tough barrier that does not significantly impede the vision of the user. The facial shield 628 includes a perimeter 630 that is secured to the fabric 612 of the shroud 608 at one or more seams 632. The helmet 602 and shroud 608, with the cuff 616, together are configured to tightly secure around a lower portion of the head 606 of the user 604 and/or around the neck 618 of the user 604, and create a controlled interior volume 634 within (FIG. 45). Thus, the user 604 breathes air from within the interior volume 634.

Figure 36:
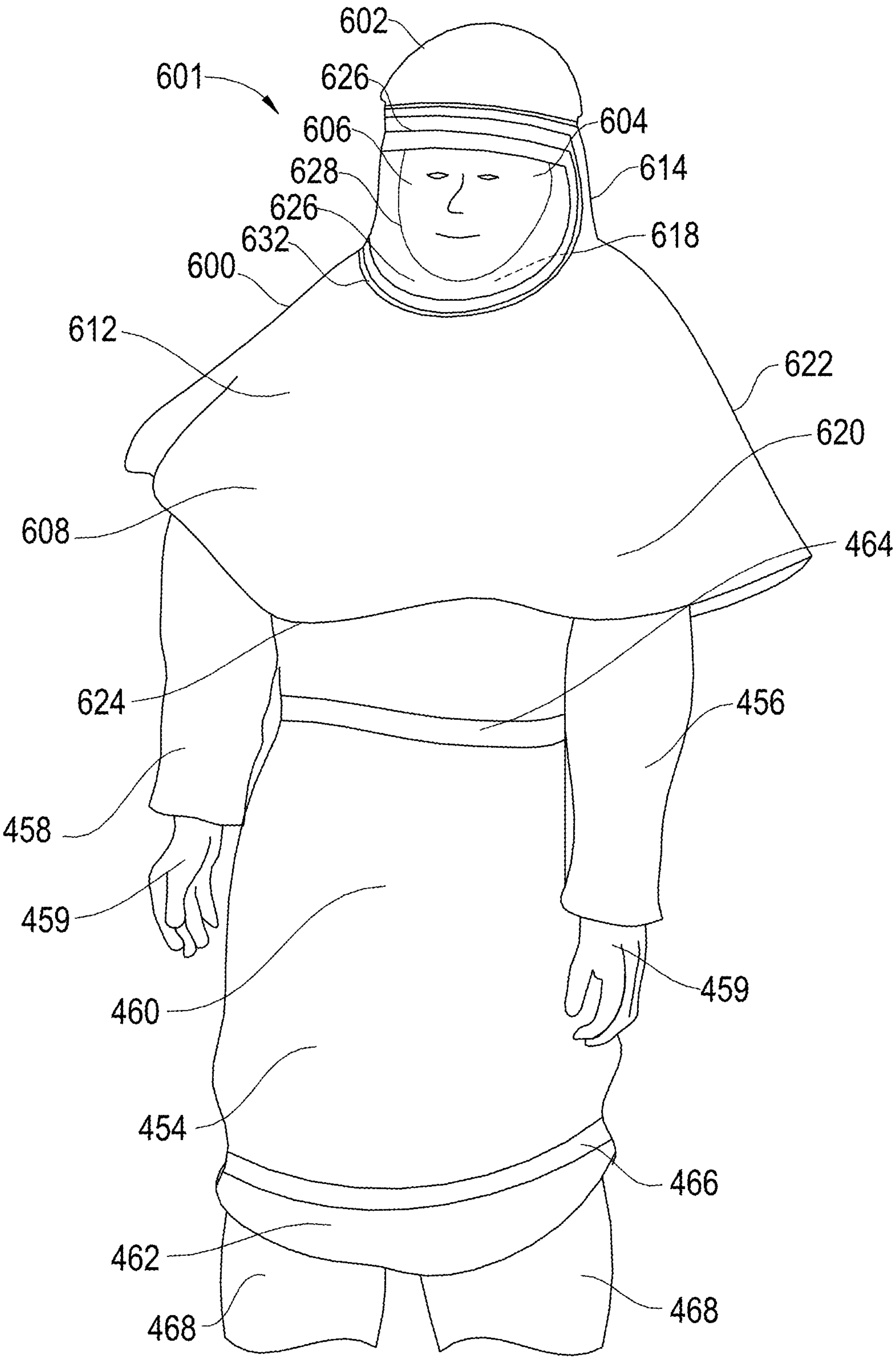
FIG. 36 is a perspective view of the hood assembly of FIG. 32 worn on a user.

FIG. 36 illustrates the user 604 donning a personal protection system 601 comprising the hood assembly 600 of FIG. 32 and a gown 454. The gown 454 comprises a left sleeve 456, a right sleeve 458, and a front portion 460 extending therebetween and extending between a lower end 462 and an upper end (not visible beneath shroud 608). The gown 454 may comprise a standard surgical gown and is configured to close in the back and be tied close with a tie 464. Alternatively, the gown 454 may be closed with a vertical seal in the back. An additional (optional) tie 466 is configured to close the gown 454 around an upper portion of the legs 468 of the user 604, or around the buttocks of the user 604. A user 604 may also wear gloves 459 over the ends of the sleeves 456, 458. In some embodiments, the systems 450, 301, 601 of FIGS. 33-36 may be used with the tie 466 untied, loosened, or completely absent. This may be done in certain cases, in order to force the majority of the exhaust out through the bottom of the gown 454, because it is thus directed to an area remote from the faces/heads of the other personnel in the surrounding work area. Overall, the particular height level of the exhaust may be manipulated by design, similar to the way air traffic (airplanes) are maintained on different altitudes by air traffic control.

Figure 46:
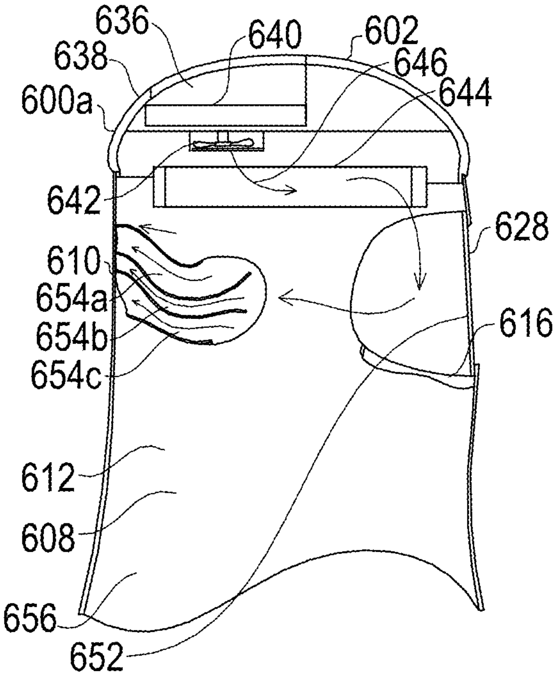
FIG. 46 is a cross-sectional view according to a first alternative embodiment of the hood assembly of FIG. 45.
Figure 47:
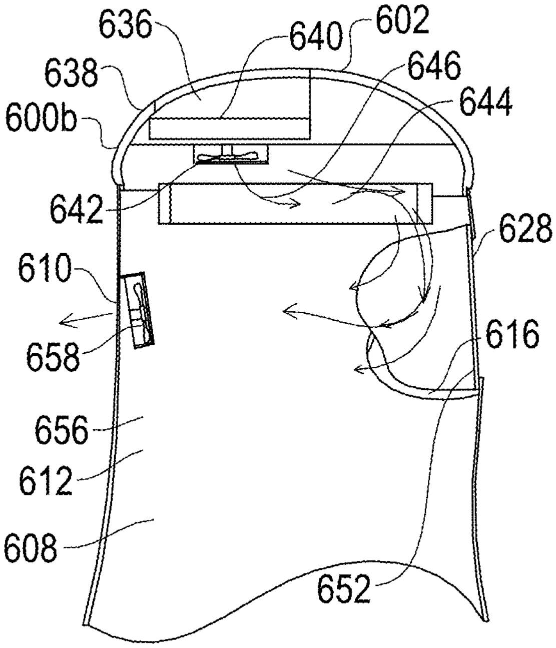
FIG. 47 is a cross-sectional view according to a second alternative embodiment of the hood assembly of FIG. 45.
Figure 48:
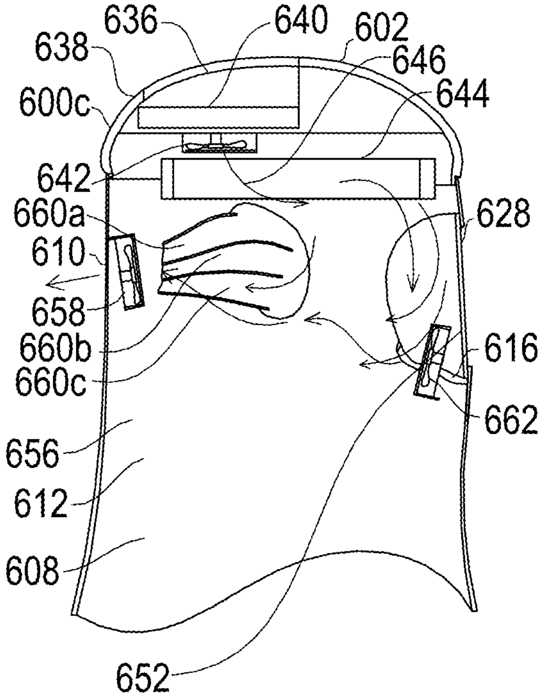
FIG. 48 is a cross-sectional view according to a third alternative embodiment of the hood assembly of FIG. 45.

A hood assembly 600*a* in FIG. 46, hood assembly 600*b* in FIG. 47, and hood assembly 600*c* in FIG. 48, each comprises an opening 636 in a proximal portion 638 of the helmet 602, and a filter 640 disposed adjacent and/or within the opening 636. Each also comprises a fan 642 adjacent the filter 640, configured to pull external air through the filter 640 and into the interior volume 634. The fan 642 may be powered from a local wired power source, or may be battery powered, including one or more rechargeable batteries. Each hood assembly 600*a*, 600*b*, 600*c* also includes a suspension band 644 for snugly holding the helmet 602 to the head 606 of the user 604. The inflow of the filtered air 646 flows toward the open space (space not blocked by the head 606 of the user 604), which favors its circulation path toward an open space 648 between the face 650 of the user 604 and the internal surface 652 of the facial shield 628.

In the hood assembly 600*a* of FIG. 46, a series of three channels 654*a*, 654*b*, 654*c* is carried on each side of the shroud 608. The channels 654 serve to guide the circulating air within the open space 648 toward the filtering fabric material 610 at a posterior portion 656 of the shroud 608. The positive pressure (e.g., gauge pressure in relation to the external environment) will then cause the air to selectively exit through the filtering fabric material 610 at a posterior portion 656 of the shroud 608. Thus, the user 604 breathes filtered air that has passed through the filter 640. Furthermore, the air exhaled by the user 604 is filtered by the filtering fabric material 610 before it is returned to the external environment. Thus, both the user 604, and other personnel within the working area are protected from potential airborne vectors.

The hood assembly 600*b* of FIG. 47 comprises an exit fan 658 instead of the channels 654. The hood assembly 600*c* of FIG. 48 comprises both guiding channels 660*a*, 660*b*, 660*c* and an exit fan 658. The exit fan 658 is configured to pull air from the open space 648 toward the filtering fabric material 610 at the posterior portion 656 of the shroud 608. Positive pressure will cause the air to exit through the filtering fabric material 610. The hood assembly 600*c* may also include an optional third fan 662, configured to push the air toward the guiding channels 660*a*, 660*b*, 660*c* and/or toward the exit fan 658. In the embodiments disclosed herein, modifications may be made having three or more channels, four or more channels, five or more channels, six or more channels, etc. In some embodiments, the channels may number between two and twenty, or between four and fourteen, or between dix and twelve. The channels may in some embodiments be parallel to each other, but may also converge or diverge to and from non-parallel configurations. In some embodiments, all of the channels may be non-parallel to each other. In other embodiments, a first number of channels X may converge into a smaller number of channels Y. For example, six channels may merge or morph into five or fewer, four or fewer, three or fewer, two or fewer, or one channel.

Figure 49:
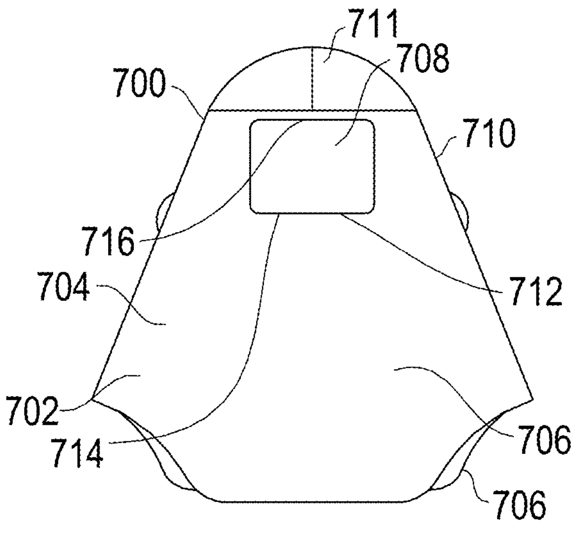
FIG. 49 is a back view of a hood assembly, according to an embodiment of the present disclosure.

In FIG. 49, a hood assembly 700 is shown, but the features taught may also be incorporated into any of the hood assemblies or bonnet assemblies disclosed herein. A rear portion 702 of the hood assembly 700 includes fabric 704 which includes a substantially impermeable sheet 706 and a filtering sheet 708 centrally located in an upper portion 710 of the hood assembly 700. The hood assembly 700 further comprises a seam 712 connecting between a perimeter 714 of the filtering sheet 708 and an opening 716 in the substantially impermeable sheet 706. The seam 712 may be formed by a number of different methods, including, but not limited to, adhesives, epoxies, hot melts, sewing, fasteners, pins, hook and loop (Velcro®), snaps, buttons, clasps, or other methods that allow for close fitting between the edges without significant gaps or openings. In some embodiments, the seam 712 comprises an airtight seal. In some embodiments, the filtration efficiency of the filtering sheet 708 may comprise particle filtration efficiency (PFE). In some embodiments, the filtration efficiency of the filtering sheet 708 may comprise viral filtration efficiency (VFE). In some embodiments, the filtration efficiency of the filtering sheet 708 may comprise bacteria filtration efficiency (BFE). In some embodiments, the filtering sheet 708 has a grammage of between about 20 $g/m^2$ and about 250 $g/m^2$. In some embodiments, the filtering sheet 708 has a grammage of between about 30 $g/m^2$ and about 250 $g/m^2$. In some embodiments, the filtering sheet 708 has a grammage of between about 30 $g/m^2$ and about 200 $g/m^2$. In some embodiments, the filtering sheet 708 has a grammage of between about 20 $g/m^2$ and about 600 $g/m^2$. In some embodiments, the filtering sheet 708 has a grammage of between about 20 $g/m^2$ and about 500 $g/m^2$. In some embodiments, the filtering sheet 708 has a grammage of between about 20 $g/m^2$ and about 100 $g/m^2$. The hood assembly 700 also includes a filtering inlet material 711.

Figure 50:
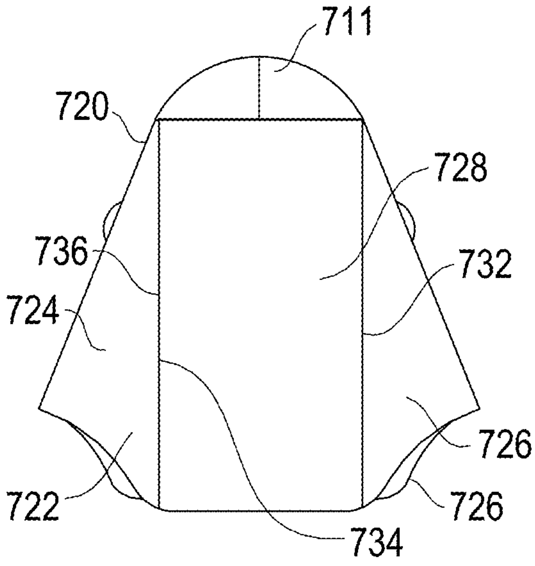
FIG. 50 is a back view of a hood assembly, according to an embodiment of the present disclosure.

In FIG. 50, a hood assembly 720 is shown, but the features taught may also be incorporated into any of the hood assemblies or bonnet assemblies disclosed herein. A rear portion 722 of the hood assembly 720 includes fabric 724 which includes a substantially impermeable sheet 726 and a filtering sheet 728 comprising a portion of the fabric 724 that is configured to be substantially posteriorly oriented when worn. The hood assembly 720 further comprises one or more seams 732 connecting between an edge 736 of the filtering sheet 728 and an edge 734 of the substantially impermeable sheet 726. The seam 732 may be formed by a number of different methods, including, but not limited to, adhesives, epoxies, hot melts, sewing, fasteners, pins, hook and loop (Velcro®), snaps, buttons, clasps, or other methods that allow for close fitting between the edges without significant gaps or openings. In some embodiments, the seam 732 comprises an airtight seal. In some embodiments, the filtration efficiency of the filtering sheet 728 may comprise particle filtration efficiency (PFE). In some embodiments, the filtration efficiency of the filtering sheet 728 may comprise viral filtration efficiency (VFE). In some embodiments, the filtration efficiency of the filtering sheet 728 may comprise bacteria filtration efficiency (BFE). In some embodiments, the filtering sheet 728 has a grammage of between about 20 $g/m^2$ and about 250 $g/m^2$. In some embodiments, the filtering sheet 728 has a grammage of between about 30 $g/m^2$ and about 250 $g/m^2$. In some embodiments, the filtering sheet 728 has a grammage of between about 30 $g/m^2$ and about 200 $g/m^2$. In some embodiments, the filtering sheet 728 has a grammage of between about 20 $g/m^2$ and about 600 $g/m^2$. In some embodiments, the filtering sheet 728 has a grammage of between about 20 $g/m^2$ and about 500 $g/m^2$. In some embodiments, the filtering sheet 728 has a grammage of between about 20 $g/m^2$ and about 100 $g/m^2$. The hood assembly 720 also includes a filtering inlet material 711.

Figure 51:
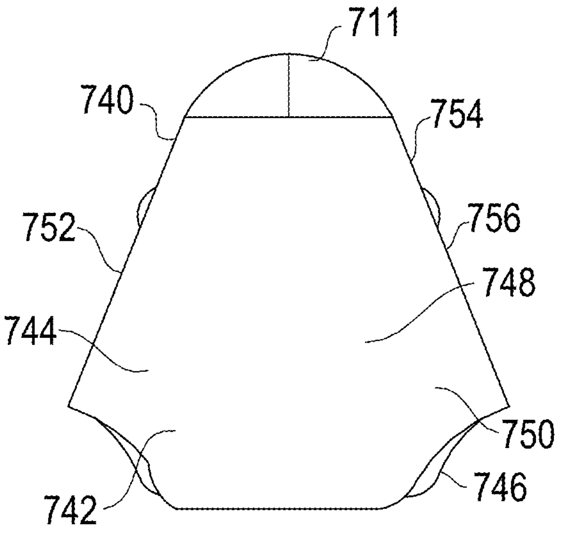
FIG. 51 is a back view of a hood assembly, according to an embodiment of the present disclosure.

In FIG. 51, a hood assembly 740 is shown, but the features taught may also be incorporated into any of the hood assemblies or bonnet assemblies disclosed herein. A rear portion 742 of the hood assembly 740 includes fabric 744 which includes a substantially impermeable sheet 746 and a filtering sheet 748 comprising the entirety of a posterior portion 750 of the hood assembly 740. The hood assembly 740 further comprises a seam 752 connecting between one or more edge 754 of the filtering sheet 748 and one or more edge 756 in the substantially impermeable sheet 746. The seam 752 may be formed by a number of different methods, including, but not limited to, adhesives, epoxies, hot melts, sewing, fasteners, pins, hook and loop (Velcro®), snaps, buttons, clasps, or other methods that allow for close fitting between the edges without significant gaps or openings. In some embodiments, the seam 752 comprises an airtight seal. In some embodiments, the filtration efficiency of the filtering sheet 748 may comprise particle filtration efficiency (PFE). In some embodiments, the filtration efficiency of the filtering sheet 748 may comprise viral filtration efficiency (VFE). In some embodiments, the filtration efficiency of the filtering sheet 748 may comprise bacteria filtration efficiency (BFE). In some embodiments, the filtering sheet 748 has a grammage of between about 20 $g/m^2$ and about 250 $g/m^2$. In some embodiments, the filtering sheet 748 has a grammage of between about 30 $g/m^2$ and about 250 $g/m^2$. In some embodiments, the filtering sheet 748 has a grammage of between about 30 $g/m^2$ and about 200 $g/m^2$. In some embodiments, the filtering sheet 748 has a grammage of between about 20 g/m$^2$ and about 600 g/m$^2$. In some embodiments, the filtering sheet 748 has a grammage of between about 20 g/m$^2$ and about 500 g/m$^2$. In some embodiments, the filtering sheet 748 has a grammage of between about 20 g/m$^2$ and about 100 g/m$^2$. The hood assembly 740 also includes a filtering inlet material 711.

Figure 52:
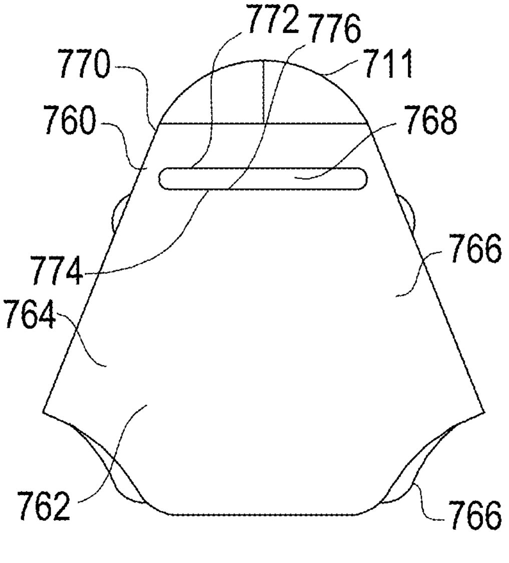
FIG. 52 is a back view of a hood assembly, according to an embodiment of the present disclosure.

In FIG. 52, a hood assembly 760 is shown, but the features taught may also be incorporated into any of the hood assemblies or bonnet assemblies disclosed herein. A rear portion 762 of the hood assembly 760 includes fabric 764 which includes a substantially impermeable sheet 766 and a filtering sheet 768 centrally located in an upper portion 770 of the hood assembly 760. The hood assembly 760 further comprises a seam 772 connecting between a perimeter 774 of the filtering sheet 768 and an opening 776 in the substantially impermeable sheet 766. The seam 772 may be formed by a number of different methods, including, but not limited to, adhesives, epoxies, hot melts, sewing, fasteners, pins, hook and loop (Velcro®), snaps, buttons, clasps, or other methods that allow for close fitting between the edges without significant gaps or openings. In some embodiments, the seam 772 comprises an airtight seal. In some embodiments, the filtration efficiency of the filtering sheet 768 may comprise particle filtration efficiency (PFE). In some embodiments, the filtration efficiency of the filtering sheet 768 may comprise viral filtration efficiency (VFE). In some embodiments, the filtration efficiency of the filtering sheet 768 may comprise bacteria filtration efficiency (BFE). In some embodiments, the filtering sheet 768 has a grammage of between about 20 g/m$^2$ and about 250 g/m$^2$. In some embodiments, the filtering sheet 768 has a grammage of between about 30 g/m$^2$ and about 250 g/m$^2$. In some embodiments, the filtering sheet 768 has a grammage of between about 30 g/m$^2$ and about 200 g/m$^2$. In some embodiments, the filtering sheet 768 has a grammage of between about 20 g/m$^2$ and about 600 g/m$^2$. In some embodiments, the filtering sheet 768 has a grammage of between about 20 g/m$^2$ and about 500 g/m$^2$. In some embodiments, the filtering sheet 768 has a grammage of between about 20 g/m$^2$ and about 100 g/m$^2$. The hood assembly 760 also includes a filtering inlet material 711.

In the hood assemblies 700, 720, 740, 760, the surface area and/or location of the filtering sheet 708, 728, 748, 768 may be tailored to help control the pressure drop of exiting air and the amount of positive pressure within the hood assembly 700, 720, 740, 760 during operation. The location of the filtering sheet 708, 728, 748, 768 may be chosen to allow the air to exit at a height and/or at an angulation that does not disturb instruments, implants, or other equipment, and does not disturb other personnel. The ratio of the total percentage of effective surface area of the filtering sheet 708, 728, 748, 768 to the total surface area of the posterior portion of the fabric 704, 724, 744, 764 in in some embodiments between about 10% and about 90%, or between about 15% and about 85%, or between about 20% and about 80%, or between about 30% and about 70%, or between about 40% and about 60%.

Figure 53:
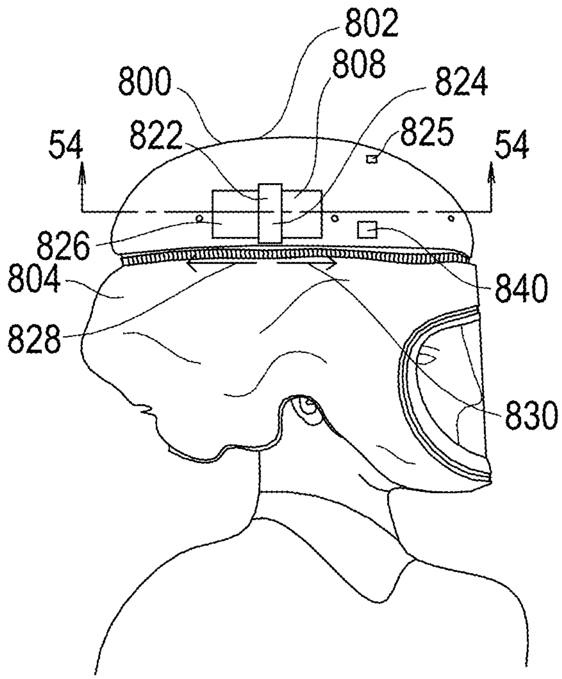
FIG. 53 is a detail view of a bonnet assembly on the head of a user, according to an embodiment of the present disclosure.
Figure 54:
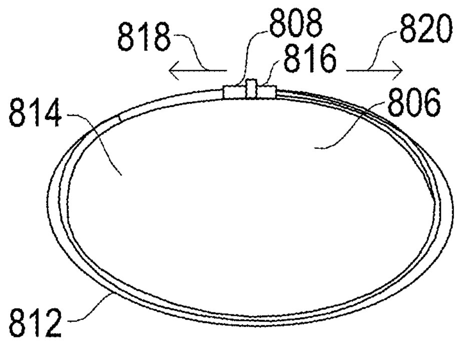
FIG. 54 is a cross-sectional view of the bonnet assembly of FIG. 53, taken along line 54.
Figure 55:
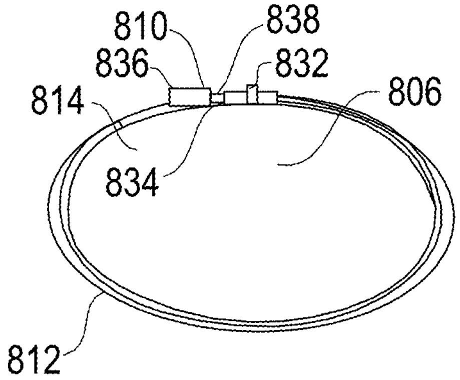
FIG. 55 is an adjustment mechanism of the bonnet assembly of FIG. 53, according to an embodiment of the present disclosure.

FIG. 53 illustrates a bonnet assembly 800 similar to the bonnet assembly 330 of FIG. 31 in that it comprises a helmet 802 and a gaiter-like head covering 804, configured to engage the helmet 802. The helmet 802, however, includes an internal filter 806 that has adjustable filtering characteristics. The bonnet assembly 800 as shown in FIGS. 53 and 54, is manually adjustable and comprises a manual adjustment system 808. Alternatively, FIG. 55 illustrates an electromechanical adjustment system 810. Both the manual adjustment system 808 and the electromechanical adjustment system 810 are configured to tighten and loosen an external ring 812 that surrounds an oval or elliptical perimeter 814 of the filter 806. In a substantially loosened configuration (FIG. 56A), the external ring 812 or band is loosened, decreasing the inward compression on the perimeter 814 of the filter 806. In the loosened configuration, the filter 806 has a larger overall surface area and has less resistance to airflow therethrough. Thus, the effective average pore size is larger. In a substantially tightened/compressed configuration (FIG. 56B), the external ring 812 or band is tightened, increasing the inward compression on the perimeter 814 of the filter 806. In the tightened configuration, the filter 806 has a smaller overall surface area and has more resistance to airflow therethrough. Thus, the effective average pore size is smaller. In this embodiment, the filter 806 is an outlet filter, filtering air inside the bonnet assembly 800, including exhaled air of the user, as the air exits through the filter 806. However, in other embodiments, the same filter configuration may be used as an inlet filter that filters outside air entering the bonnet assembly.

In some embodiments, the filter 806 may be adjustable within the range of particle filtration efficiency (PFE). In some embodiments, the filter 806 may be adjustable within the range of viral filtration efficiency (VFE). In some embodiments, the filter 806 may be adjustable within the range of bacteria filtration efficiency (BFE). In some embodiments, the filter 806 may be adjustable between two of these ranges, or in some embodiments between all three of these ranges.

Figure 56A:
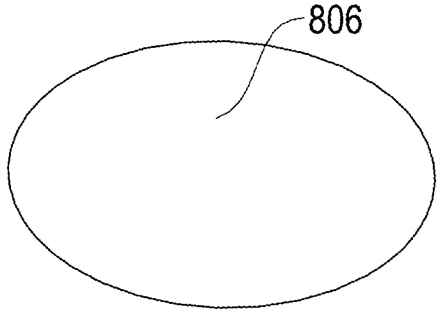
FIG. 56A illustrates an adjustable filter of the bonnet assembly of FIG. 53 in a first adjustment state.
Figure 56B:
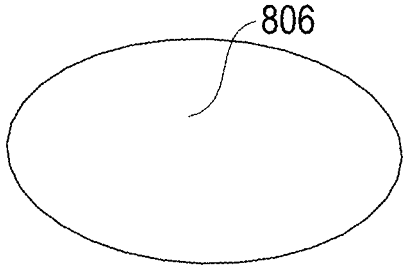
FIG. 56B illustrates an adjustable filter of the bonnet assembly of FIG. 53 in a first adjustment state.

The manual adjustment system 808 comprises a slide 816 which may be slidable in a first direction 818 that loosens the external ring 812 and allows the filter 806 to expand toward the loosened configuration of FIG. 56A. The slide 816 is also slidable in a second direction 820 that tightens the external ring 812 and compresses the filter toward the tightened configuration of FIG. 56B. A sliding interface 822 includes a knob 824 and a body 826. The sliding interface 822 has a concave underside that engages the slide 816 such that when the knob 824 is gripped by the user or other personnel and moved in a first direction 828, the slide 816 is moved in the first direction 818. Furthermore, when the knob 824 is gripped by the user or other personnel and moved in a second direction 830, the slide 816 is moved in the second direction 820. In some embodiments, a ratchet and lock may be used on the slide 816 and/or the sliding interface 822, to lock the slide 816 in place when it is not being adjusted. In some embodiments, the sliding interface 822 may include a radial spring-load, so that it can be pushed in (toward the user's head) to unlock it and allow it to be slid in either direction 828, 830, and released to allow it to lock in place.

The electromechanical adjustment system 810 includes a slide 832 that includes an internal (female) screw thread 834. A motor 836 is rotationally coupled to a lead screw 838 which is threadingly engaged within the internal screw thread 834. An on/off button 840 (for simplicity, shown in FIG. 53) turns the motor on or off. The button can toggle in a three-way manner to off; first direction; second direction. In some embodiments, the motor in its off position is able to serve as a lock to lock the configuration of the filter 806 in place. In some embodiments, a microprocessor 825 is carried by a circuit on the helmet 802, and includes an artificial intelligence (AI) system configured to integrate with the electromechanical adjustment system 810. The bonnet assembly 800 may further incorporate one or more sensor, such as the sensors 204, 210, 218, 224, 234, 244 of the embodiments of FIGS. 22-27, and build an adjustment protocol for the electromechanical adjustment system 810 that depends upon measured characteristics from the sensor (s), such as air pressure, air flow rate, air temperature, air humidity, etc.

Figure 57:
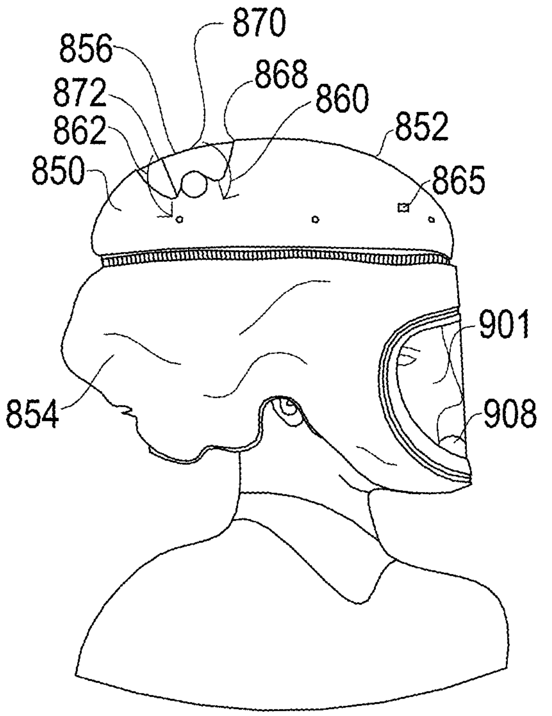
FIG. 57 is a detail view of a bonnet assembly on the head of a user, according to an embodiment of the present disclosure.
Figure 58:
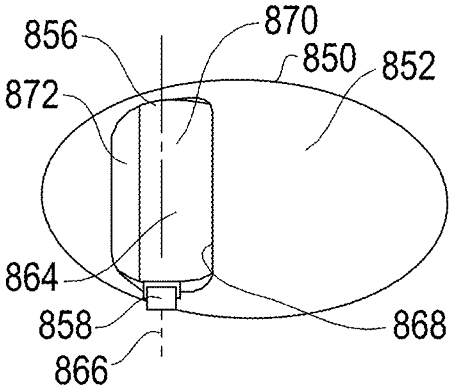
FIG. 58 is an adjustment mechanism of the bonnet assembly of FIG. 57, according to an embodiment of the present disclosure.

FIGS. 57-58 illustrate a bonnet assembly 850 similar to the bonnet assembly 330 of FIG. 31 in that it comprises a helmet 852 and a gaiter-like head covering 854, configured to engage the helmet 852. The helmet 852, however, includes an internal filter 856 that has adjustable filtering characteristics. The filter 856 is at least partially rotatable and adjustable in relation to the helmet 852. The filter 856 is connected to a knob 858 which can be gripped by the user or other personnel and can be turned in a first direction 860 or a second direction 862 with respect to an axis 866. The filter 856 has a convex side 864 configured to slide just underneath a window 868 in the helmet 852. The extend of the dimensions (axial and transverse) of the filter 856 as such that the filter 856 effectively fills the window 868 of the helmet 852, regardless of the adjusted position of the filter 856. The filter 856 comprises a permeable, filtering portion 870, and a substantially impermeable portion 872 adjacent the filtering portion 870. As shown, the filtering portion 870 is anterior to the impermeable portion 872, but in other embodiments, they may be reversed. Alternatively, there may be one or more of each portion. In other embodiment, the filter 856 may be rotatable around a different axis (transverse, etc.).

In this embodiment, the filter 856 is an outlet filter, filtering air inside the bonnet assembly 850, including exhaled air of the user, as the air exits through the filter 856. However, in other embodiments, the same filter configuration may be used as an inlet filter that filters outside air entering the bonnet assembly. With respect specifically to the embodiment of FIGS. 57-58, when the knob 858 is gripped and the knob 858 and filter 856 are rotated in the first direction 860, the effective filtering surface area of the filtering portion 870 within the window 868, or immediately adjacent the window 868, is decreased, and the blocking area of the substantially impermeable portion 872 within the window 868, or immediately adjacent the window 868, is increased. Thus, turning the knob 858 in the first direction 860 increases the resistance to the passage of air through the filter 856. The knob can thus be turned in the first direction 860 to temporarily increase the positive pressure within the bonnet assembly 850. When the knob 858 is gripped and the knob 858 and filter 856 are rotated in the second direction 862 The effective filtering surface area of the filtering portion 870 within the window 868, or immediately adjacent the window 868, is increased, and the blocking area of the substantially impermeable portion 872 within the window 868, or immediately adjacent the window 868, is decreased. Thus, turning the knob 858 in the second direction 862 decreases the resistance to the passage of air through the filter 856. The knob can thus be turned in the second direction 862 to temporarily decrease the positive pressure within the bonnet assembly 850. In an alternative embodiment, the knob 858 may be replaced by a button-operated electromechanical adjustment system, in a somewhat similar manner as that described with the embodiment of FIG. 55. In another alternative embodiment, the adjustment of the filtering portion 870 may also include some compression and loosening adjustment, as in the embodiment of FIG. 53.

In some embodiments, a microprocessor 865 is carried by a circuit on the helmet 852, and includes an artificial intelligence (AI) system configured to integrate with the alternative electromechanical adjustment system. The bonnet assembly 850 may further incorporate one or more sensor, such as the sensors 204, 210, 218, 224, 234, 244 of the embodiments of FIGS. 22-27, and build an adjustment protocol for the electromechanical adjustment system that depends upon measured characteristics from the sensor(s), such as air pressure, air flow rate, air temperature, air humidity, etc.

Figure 59:
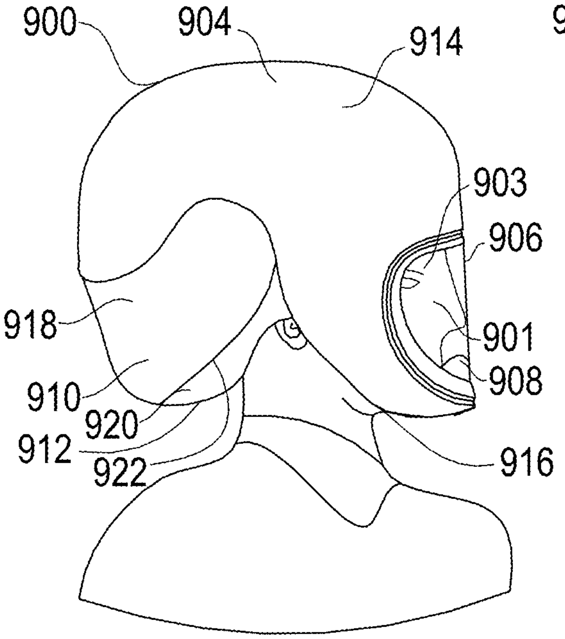
FIG. 59 illustrates the bonnet assembly of FIG. 57 in a first adjustment state.
Figure 60:
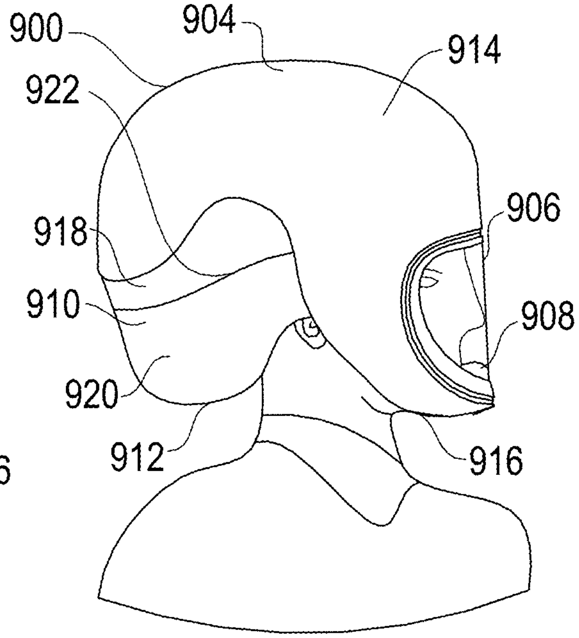
FIG. 60 illustrates the bonnet assembly of FIG. 57 in a second adjustment state.
Figure 61:
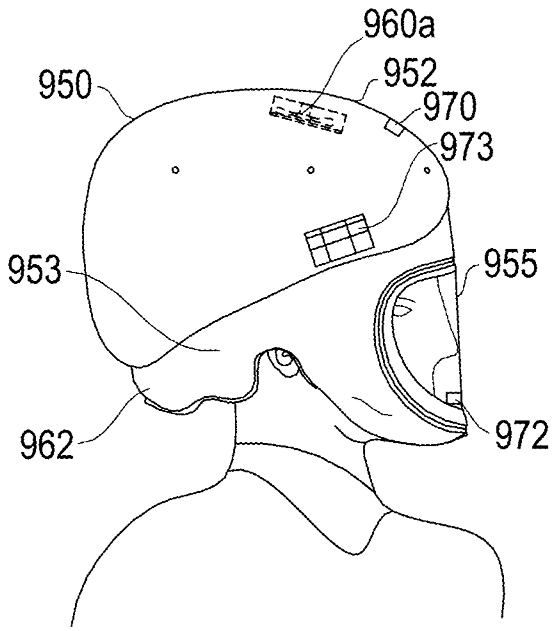
FIG. 61 is a detail view of a bonnet assembly on the head of a user, according to an embodiment of the present disclosure.
Figure 62:
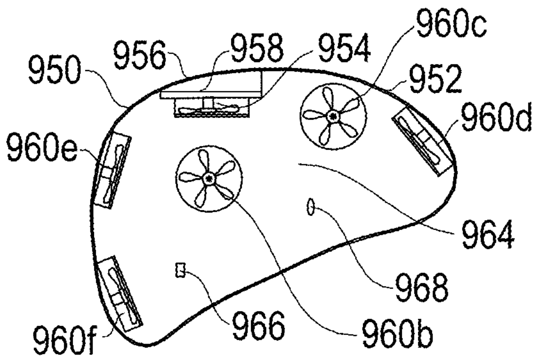
FIG. 62 is a cross-section view of the bonnet assembly of FIG. 61.

FIGS. 59-60 illustrate a bonnet assembly 900 similar to the bonnet assembly 300 of FIGS. 28-29 in that it comprises a head cover 904, coupled to a facial shield 906. The head cover 904 is also coupled to a cuff 908 that is able to conform to the face 903 of a user 901. The head cover 904 includes a first portion 910 that fits around the posterior portion of the user's head and includes a substantially anterior-facing upward sweep 912 to avoid the user's ear. The head cover 904 also includes a second portion 914 that partially overlaps the first portion 910. The second portion 914 includes a substantially posterior-facing upward sweep 916 that fits around the lower face of the user to also avoid the user's ear.

The first portion 910 is formed from at least two different types of fabric, including at least a permeable, filtering portion 918, and a substantially impermeable portion 920. The first portion 910 may be adjusted in relation to the second portion 914 to increase or decrease the effective surface area of the first portion 910, and thus the surface are that is configured for filtering the outflow of air (including exhalant) from the interior of the bonnet assembly 900. FIG. 59 illustrates a first configuration wherein a larger effective surface area of the first portion 910 is configured for filtering the outflow air. FIG. 60 illustrates a second, adjusted configuration, in which some of the first portion 910 that was set up for filtering in the first configuration of FIG. 59 has now been slid under the second portion 914. Thus, in the second configuration of FIG. 60, there is a smaller effective surface are of the first portion 910 configured for filtering the outflow air. The ratio of the total percentage of effective surface area of the first portion 910 to the total (first portion 910 plus second portion 914) surface area may be adjustable between about 10% and about 90%, or between about 20% and about 80%, or between about 30% and about 70%. In other embodiments, the first portion 910 may be adjustable such that it can be doubled up upon itself, to increase the resistance to flow, and/or increase the amount of filtering and/or decrease the size of particles that may pass.

The first portion 910 and second portion 914 may be attached together at a seam 922. The seam 922 may be formed by a number of different methods, including, but not limited to, adhesives, epoxies, hot melts, sewing, fasteners, pins, hook and loop (Velcro®), snaps, buttons, clasps, or other methods that allow for close fitting between the edges without significant gaps or openings. In some embodiments, the seam 922 comprises an airtight seal. In some embodiments, the filtration efficiency of the first portion 910 may comprise particle filtration efficiency (PFE). In some embodiments, the filtration efficiency of the first portion 910 may comprise viral filtration efficiency (VFE). In some embodiments, the filtration efficiency of the first portion 910 may comprise bacteria filtration efficiency (BFE). In some embodiments, the first portion 910 has a grammage of between about 20 $g/m^2$ and about 250 $g/m^2$. In some embodiments, the first portion 910 has a grammage of between about 30 $g/m^2$ and about 250 $g/m^2$. In some embodiments, the first portion 910 has a grammage of between about 30 $g/m^2$ and about 200 $g/m^2$. In some embodiments, the first portion 910 has a grammage of between about 20 $g/m^2$ and about 600 $g/m^2$. In some embodiments, the first portion 910 has a grammage of between about 20 $g/m^2$ and about 500 $g/m^2$. In some embodiments, the first portion 910 has a grammage of between about 20 $g/m^2$ and about 100 $g/m^2$. Another advantage of adjustable outflow filter permeability and/or surface area, is that an optimum flow resistance combined with sufficient filtering can be achieved, so that motors (e.g., from fans) do not have to be overworked. Thus, battery life can be extended, and/or power usage and expenditure can be reduced. In some embodiments, the cuff 908 may be replaced by or augmented with an adhesive to sealingly secure the bonnet assembly 900 around the neck of the user. In some embodiments, the adhesive may comprise neoprene adhesive, silicone adhesive, or polyurethane adhesive.

FIGS. 61-64 illustrate a bonnet assembly 950 somewhat similar to the bonnet assembly of FIG. 31, FIG. 41, and the FIG. 43 embodiment, and comprises a helmet 952 and a head cover 953 which engages with the helmet 952. However, the helmet 952 includes three or more internal fans (air movers), or four or more, or five or more, or six or more, or seven or more, or between three and ten, or between three and nine, or between three and eight, or between three and seven. The particular embodiment of FIGS. 61-64 has seven internal fans: one inflow fan 954 located at an opening 956 in the helmet adjacent a filter 958, and six other fans 960*a-f*. In some embodiments, one or more fans (e.g., fan 960*f*) may be an outflow fan, adjacent an opening in the helmet 952, or adjacent filtering material 962 in the head cover 953. The head cover 953 includes a facial shield 955, as previously described in other embodiments herein. Also carried within the interior 964 of the helmet 952 is at least one pressure sensor 966 and at least one flow sensor 968. In some embodiments, there may be only one sensor (pressure, or flow, or other), and in other embodiments there may be three of more sensors. The sensor may comprise any sensor which can determine the status of the flow characteristics within the helmet 952, including a temperature sensor or a humidity sensor. A controller 970 is carried on the helmet 952, or alternatively may be carried separate from the helmet. The controller 970 is configured to turn any one or more of the fans 954, 960 on or off, and/or to increase or decrease their speed. The circulation of air within the helmet 952 can be manually controlled, via the operation of the fans 954, 960, by the user via voice commands to a microphone 972 which is coupled to the controller 970. Alternatively, it can be controlled by a user interface 973. The circulation of air within the helmet 952 can alternatively be automatically controlled, via the operation of the fans 954, 960 by the controller 970 based on feedback from the one or more sensors 966, 968.

Figure 63:
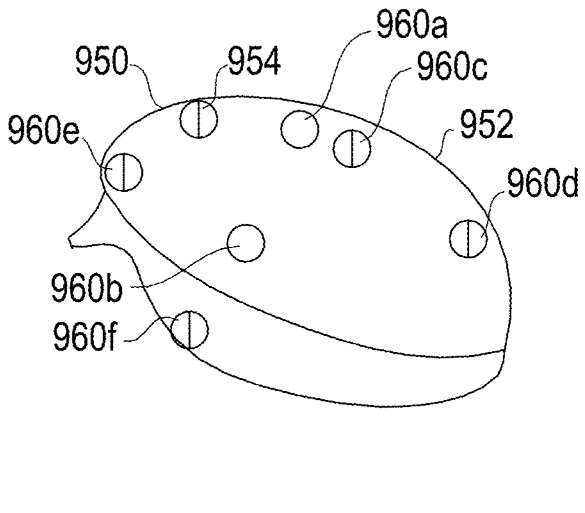
FIG. 63 is a first operational condition of the bonnet assembly of FIG. 61.
Figure 64:
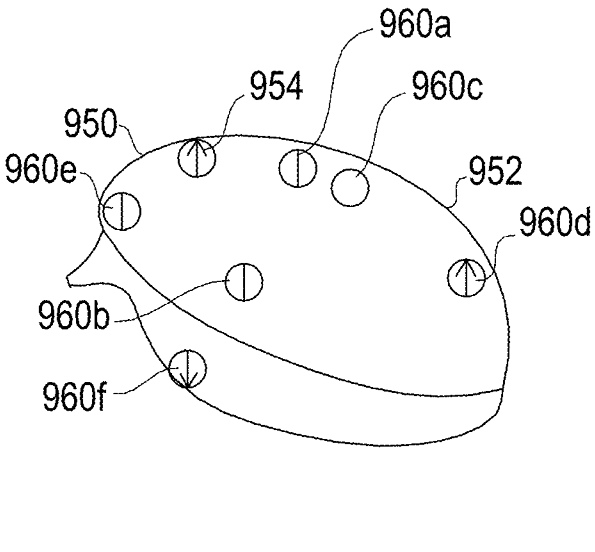
FIG. 64 is a first operational condition of the bonnet assembly of FIG. 61.

FIG. 63 illustrates the bonnet assembly 950 in a first, initial operation configuration. An "on" fan is indicated by a vertical line and an "off" fan is indicated by no vertical line. FIG. 63 illustrates the bonnet assembly 950 after the controller 970 has changed the operation of one or more fans. An increase speed fan is indicated by an up arrow and a decreased speed fan is indicated by a down arrow. In some embodiments, the controller 970 is configured to turn on or increase the speed of a first of a plurality of fans (e.g., 2 or more, 3 or more, 4 or more, 5 or more, 6 or more, 7 or more, etc.) while turning of or decreasing the speed of a second of the plurality of fans. In some embodiments, an adjustable aperture, such as the aperture 250 of FIG. 27, may also be incorporated.

In some embodiments, the controller 970 includes a microprocessor comprising an artificial intelligence (AI) system configured to integrate with the bonnet assembly 950. The bonnet assembly 950 may further incorporate one or more sensor, such as the sensors 204, 210, 218, 224, 234, 244 of the embodiments of FIGS. 22-27, and build an adjustment protocol for the fans 954, 960*a-f* that depends upon measured characteristics from the sensor(s), such as air pressure, air flow rate, air temperature, air humidity, etc. In some embodiments, Inter-Integrated Circuit ($I^2C$) is incorporated to further control the sensors. BlueTooth™ (Bluetooth Sig Inc.) capability may also be combined.

In any of the embodiments presented, the fabric, cover, bonnet, hood, etc. may comprise a disposable material. In some embodiments, the cover, bonnet, shroud, or hood may be doubled. In other words, two of the cover, bonnet, shroud, or hood may be worn, one over the other. In other embodiments, three or more of the cover, bonnet, shroud, or hood may be worn. In some embodiments, the double, triple, etc. cover, bonnet, shroud, or hood, may have seams connecting the edges of the layers to each other. In some embodiments, a double layer cover, bonnet, shroud, or hood, includes an inner layer configured to be tucked into a gown or other garment, and an outer layer configured to lie over the gown or other garment. In FIG. 36, the hood assembly 600 of the personal protection system 601 includes the visible outer layer of the shroud 608 that lies over the gown 454, but also includes an inner layer (not visible) that is tucked inside the gown 454. Thus, the outer layer provides splash protection while the inner layer provides some securement. In some embodiments, the inner layer comprises filter material while the outer layer comprises barrier e.g, substantially impermeable) material, thus to aid in the filtering of outflow air (inner layer material) and the protection of the user (outer layer material).

Thus, in certain embodiments, a personal protection system utilizing elements of the above disclosure may be configured to protect the user (wearer). In other embodiments, a personal protection system utilizing elements of the above disclosure may be configured to protect other from the user (wearer). In still other embodiments, a personal protection system utilizing elements of the above disclosure may be configured to both protect the user (wearer) and to protect others from the user (wearer).

While the foregoing is directed to embodiments of the present disclosure, other and further embodiments may be devised without departing from the basic scope thereof.

The following clauses include examples of apparatus of the disclosure:

Clause 1: In one example, a protective headgear system includes a cover configured to cover the head of a user, the cover including a substantially transparent facial shield and sheet material sealingly coupled to the facial shield, wherein the sheet material includes at least a portion configured to filter contaminants from air, wherein the cover provides an interior volume configured to isolate air supplied to the user, an input blower configured to draw air into the interior volume of the cover, and an output blower configured to draw air out of the interior volume of the cover through at least a portion of the sheet material, wherein the input blower and the output blower are configured to be individually controlled.

Clause 2: In some examples, the system of clause 1 further includes a controller configured to control operation of the output blower.

Clause 3: In some examples, the system of clause 2 includes wherein the control is further configured to control operation of the input blower.

Clause 4: In some examples, the system of clause 1 further includes a controller configured to control operation of the input blower.

Clause 5: In some examples, the system of any one of clauses 2-4 includes wherein the operation control by the controller includes changing fan speed.

Clause 6: In some examples, the system of any one of clauses 2-5 includes wherein the operation control by the controller includes increasing fan speed.

Clause 7: In some examples, the system of any one of clauses 2-6 includes wherein the operation control by the controller includes decreasing fan speed.

Clause 8: In some examples, the system of clause 7 includes wherein decreasing fan speed includes at least temporarily decreasing fan speed to 0 rpm.

Clause 9: In some examples, the system of either one of clauses 2 or 3 further includes a first sensor configured to sense a first characteristic related to the interior volume of the cover.

Clause 10: In some examples, the system of clause 9 includes wherein the first characteristic is a pressure of the interior volume.

Clause 11: In some examples, the system of either one of clauses 9 or 10 further includes a second sensor configured to sense a second characteristic related to the interior volume of the cover.

Cause 12: In some examples, the system of clause 11 includes wherein the second characteristic is a temperature of the interior volume.

Clause 13: In some examples, the system of any one of clauses 9-12 includes wherein the controller is configured receive a signal from the first sensor indicative of the first characteristic, and wherein the controller is configured to control operation of the output blower, based at least in part on the first characteristic.

Clause 14: In some examples, the system of clause 13 includes wherein the controller is configured to control operation of the input blower, based at least in part on the first characteristic.

Clause 15: In some examples, the system of any one of clauses 9-12 includes wherein controller is configured receive a signal from the first sensor indicative of the first characteristic, and wherein the controller is configured to control operation of the input blower, based at least in part on the first characteristic.

Clause 16: In some examples, the system of any one of clauses 13-15 includes wherein the operation control by the controller includes changing fan speed.

Clause 17: In some examples, the system of any one of clauses 13-16 includes wherein the operation control by the controller includes increasing fan speed.

Clause 18: In some examples, the system of any one of clauses 13-17 includes wherein the operation control by the controller includes decreasing fan speed.

Clause 19: In some examples, the system of clause 18 includes wherein decreasing fan speed includes at least temporarily decreasing fan speed to 0 rpm.

Clause 20: In some examples, the system of either one of clauses 13 or 14 includes wherein the controller is configured to control operation of the output blower based on a differential pressure.

Clause 21: In some examples, the system of clause 20 includes wherein the differential pressure includes a difference between the first characteristic and an ambient pressure outside of the cover.

Clause 22: In some examples, the system of any one of clauses 1-21 further includes a plurality of channels coupled to an internal surface of the cover, and configured to direct the flow of air toward an intake coupled to the output blower.

Clause 23: In some examples, the system of clause 22 includes wherein the plurality of channels includes X channels, and wherein the X channels converge into Y channels, wherein Y is less than X.

Clause 24: In some examples, the system of either one of clauses 22 or 23 further includes an artificial intelligence system configured to integrate with the compressor.

Clause 25: In some examples, the system of any one of clauses 1-24 includes wherein the cover is configured to substantially seal air supplied to the user such that it can only leave through the output blower.

Clause 26: In some examples, the system of any one of clauses 1-25 includes wherein the cover includes a hood.

Clause 27: In some examples, the system of any one of clauses 1-26 includes wherein the at least a portion of the sheet material generally includes a posterior portion of the cover.

Clause 28: In some examples, the system of clause 27 includes wherein the sheet material includes an anterior-facing sheet and a posterior-facing sheet sealingly secured to each other around portions of their peripheries.

Clause 29: In some examples, the system of clause 28 includes wherein the anterior-facing sheet includes two or more layers.

Clause 30: In some examples, the system of clause 29 includes wherein the posterior-facing sheet includes a posterior filtering sheet, and wherein the anterior-facing sheet includes an anterior filtering sheet and an anterior barrier sheet, substantially covering one side of the anterior filtering sheet.

Clause 31: In some examples, the system of clause 28 includes wherein one of the anterior-facing sheet and the posterior-facing sheet includes a first filter media and wherein the other of the anterior-facing sheet and posterior-facing sheet includes a second filter media, the first filter media having a higher filtration efficiency than the second filter media.

Clause 32: In some examples, the system of clause 31 includes wherein the filtration efficiency includes particle filtration efficiency (PFE).

Clause 33: In some examples, the system of clause 31 includes wherein the filtration efficiency includes viral filtration efficiency (VFE).

Clause 34: In some examples, the system of clause 31 includes wherein the filtration efficiency includes bacteria filtration efficiency (BFE).

Clause 35: In some examples, the system of clause 31 includes wherein the first filter media has a grammage of between about 20 $g/m^2$ and about 250 $g/m^2$.

Clause 36: In some examples, the system of clause 35 includes wherein the second filter media has a grammage of between about 20 $g/m^2$ and about 500 $g/m^2$.

Clause 37: In some examples, the system of clause 31 includes wherein second filter media has a grammage of between about 30 $g/m^2$ and about 250 $g/m^2$.

Clause 38: In some examples, the system of any one of clauses 31-37 includes wherein the anterior-facing sheet includes the first filter media and wherein the posterior-facing sheet includes the second filter media.

Clause 39: In some examples, the system of any one of clauses 31-38 includes wherein the cover is configured to be tucked into a gown, the gown configured to cover portions of the body of the user.

Clause 40: In some examples, the system of clause 39 includes wherein the cover further includes a securement member configured to secure around the neck of the user.

Clause 41: In some examples, the system of clause 40 includes wherein the securement member is a tie configured to be tied around the neck of the user.

Clause 42: In some examples, the system of either one of clauses 40 or 41 includes wherein the securement member is configured to at least partially control the air drawn into the interior volume of the cover.

Clause 43: In another example, a protective headgear system includes a cover configured to cover the head of a user, the cover including a substantially transparent facial shield and a sheet material sealingly coupled to the facial shield, the sheet material configured to filter contaminants from air, wherein the cover provides an interior volume configured to isolate air supplied to the user, wherein a volume of at least 500 cubic centimeters of open space is adjacent the face of the user when the cover is placed on the head of the user with the facial shield in front of the face of the user, and a blower configured to draw air into the interior volume of the cover and/or configured to draw air out of the interior volume of the cover through the sheet material.

Clause 44: In yet another example, a protective headgear system includes a cover configured to cover the head of a user, the cover including a substantially transparent facial shield and a sheet material sealingly coupled to the facial shield, the sheet material configured to filter contaminants from air, wherein the cover provides an interior volume configured to isolate air supplied to the user, a blower configured to draw air into the interior volume of the cover and to draw air out of the interior volume of the cover through the sheet material, and an exit orifice coupled to and downstream of the sheet material, the exit orifice having an adjustable flow resistance.

Clause 45: In some examples, the system of clause 39 further includes a controller configured to control adjustment of the exit orifice.

Clause 46: In some examples, the system of either one of clauses 44 or 45 includes wherein the exit orifice includes an adjustable internal diameter.

Clause 47: In some examples, the system of any one of clauses 44-46 includes wherein the exit orifice includes an adjustable cross-sectional shape.

Clause 48: In some examples, the system of any one of clauses 44-47 includes wherein the exit orifice includes an adjustable inner surface characteristic.

Clause 49: In some examples, the system of any one of clauses 44-48 includes wherein the exit orifice is configured to have a changeable taper angle.

Clause 50: In some examples, the system of either one of clauses 44 or 45 includes further including a flow baffle configured to adjustably add or remove flow resistance to or from the exit orifice.

Clause 51: In still another example, a protective headgear system includes a cover configured to cover the head of a user, the cover including a substantially transparent facial shield and sheet material sealingly coupled to the facial shield, wherein the sheet material includes at least a portion configured to filter contaminants from air, wherein the cover provides an interior volume configured to isolate air supplied to the user, an outlet filter configured to filter air exiting the cover, and a blower configured to draw air into the interior volume of the cover, wherein the cover includes one or more channels configured to direct the air toward the outlet filter.

Clause 52: In some examples, the system of clause 51 includes wherein the one or more channels are formed from a flexible low air permeability material.

Clause 53: In some examples, the system of either one of clauses 51 or 52 includes wherein the blower is further configured force air through the outlet filter.

Clause 54: In yet another example, a protective headgear system includes a support configured to engage the head of a user, a cover configured to be coupled to the support and to cover the head of a user, the cover including a substantially transparent facial shield and sheet material sealingly coupled to the facial shield, wherein the sheet material includes at least a portion configured to filter contaminants from air, wherein the cover provides an interior volume configured to isolate air supplied to the user, an outlet filter configured to filter air exiting the cover, and a blower configured to draw air into the interior volume of the cover, wherein the support includes one or more channels configured to direct the air toward the outlet filter.

Clause 55: In some examples, the system of clause 54 includes wherein the one or more channels are formed from a flexible low air permeability material.

Clause 56: In some examples, the system of either one of clauses 54 or 55 includes wherein the blower is further configured force air through the outlet filter.

Clause 57: In some examples, the system of any one of clauses 1-27 or 43-50 includes wherein the sheet material includes an inlet filter having an outer convex surface, and an opposing inner concave surface configured to engage above a top of the user's head.

Clause 58: In some examples, the system of clause 57 includes further including a head engagement structure coupled to the inlet filter configured to directly engage the user's head.

Clause 59: In still another example, a protective headgear system includes a cover configured to cover the head of a user, the cover including a fabric, the cover arranged in a first layer configured to cover a posterior portion of a user's head and an second layer, at least partially covering the first layer, and configured to cover at least the lower portion of the user's face, wherein neither the first layer or the second layer cover the earholes of the user, thus allowing free access to in-the-ear earphones or earplugs.

Clause 60: In some examples, the system of clause 59 includes wherein the second layer is configured to snap to the first layer in order to maintain the access of the user's ears to the in-the-ear earphones or earplugs.

Clause 61: In some examples, the system of clause 60 includes wherein the second layer may be unsnapped from the first layer, such that the second layer can be pulled over the ears of the user.

Clause 62: In some examples, the system of clause 59 includes further including a tie configured to maintain the position of the second layer.

Clause 63: In yet another example, a protective headgear system includes a cover configured to cover the head of a user, the cover including a substantially transparent facial shield and sheet material sealingly coupled to the facial shield, wherein the sheet material includes at least a filtering portion configured to filter contaminants from gases, wherein the cover provides an interior volume isolated from external air, an air mover configured to draw some of the external air into the interior volume of the cover, a filter coupled to the cover and configured to filter the drawn air, and one or more channels carried by the cover and configured to direct internal air within the interior volume, including at least some exhaled air from the user, toward the filtering portion of the sheet material.

Clause 64: In still another example, a protective headgear system includes a cover configured to cover the head of a user, the cover including a substantially transparent facial shield and sheet material sealingly coupled to the facial shield, wherein the sheet material includes at least a filtering portion configured to filter contaminants from gases, wherein the cover provides an interior volume isolated from external air, an air mover configured to draw some of the external air into the interior volume of the cover, a filter coupled to the cover and configured to filter the drawn air, and one or more directors carried by the cover and configured to direct internal air within the interior volume, including at least some exhaled air from the user, toward the filtering portion of the sheet material.

Clause 65: In some examples, the system of clause 64 includes wherein the one or more directors includes one or more channels.

Clause 66: In some examples, the system of clause 64 includes wherein the one or more directors includes one or more fans.

Clause 67: In some examples, the system of clause 66 includes wherein the one or more directors further includes one or more channels.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

For purposes of the present disclosure and appended claims, the conjunction "or" is to be construed inclusively (e.g., "an apple or an orange" would be interpreted as "an apple, or an orange, or both"; e.g., "an apple, an orange, or an avocado" would be interpreted as "an apple, or an orange, or an avocado, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open-ended terminology, with the same meaning as if the phrase "at least" were appended after each instance thereof.

What is claimed is:

1. A protective headgear system comprising:

a cover configured to cover the head of a user, the cover comprising:

a substantially transparent facial shield having a perimeter; and a sheet sealingly coupled to the facial shield around its perimeter, wherein the sheet comprises a substantially anterior portion comprising a first sheet material configured to act as a substantial barrier to the passage of air, the sheet further comprising a substantially posterior portion comprising a second sheet material configured to filter contaminants from air, the sheet further comprising one or more seams between the first sheet material and the second sheet material;

a lower barrier configured to significantly create a flow barrier between the cover and the neck of the user for providing an interior volume within the cover, significantly isolated from external air;

a fan configured to draw some of the external air into the interior volume of the cover;

a filter coupled to the cover and configured to filter the external air as it is drawn into the interior volume by the fan; and one or more channels spaced downstream from the fan within the cover, the one or more channels comprising one or more channel outlets oriented toward the second sheet material to direct internal air without any additional fan, including at least some exhaled air from the user, toward the second sheet material of the posterior portion of the sheet.

2. The system of claim 1, wherein the lower barrier comprises an elongate tie configured to be secured around an exterior of the sheet.

3. The system of claim 2 wherein the tie is configured to be secured at varying levels if tightness to control an amount of restriction of the flow barrier.

4. The system of claim 1, wherein the lower barrier comprises a cuff.

5. The system of claim 4, wherein the cuff is configured to secure below the chin of the user.

6. The system of claim 4, wherein the cuff is configured to secure around the neck of the user.

7. The system of claim 4, wherein the cuff comprises an elastic band.

8. The system of claim 1, wherein the filter comprises a portion of the second sheet material.

9. The system of claim 1, wherein the filter comprises a third sheet material configured to filter contaminants from air.

10. The system of claim 9, further comprising one or more additional seams between the third sheet material and the first sheet material.

11. The system of claim 1, wherein the second sheet material comprises a breathable Type 4 composite material.

12. The system of claim 1, wherein the second sheet material comprises a substantially centrally-located portion of the posterior portion of the sheet.

13. The system of claim 1, wherein the second sheet material comprises a surface area of between about 15 percent and about 85 percent of a surface area of the posterior portion of the sheet.

14. The system of claim 1, wherein the second sheet material has a variable surface area in relation to a surface area of the posterior portion of the sheet.

15. The system of claim 14, wherein the surface area of the second sheet material in relation to the surface area of the posterior portion of the sheet is adjustable.

16. The system of claim 15, wherein the adjustment is configured to be performed via manual manipulation.

17. The system of claim 15, wherein the adjustment is configured to be performed electro-mechanically.

18. The system of claim 17, further comprising an artificial intelligence system configured to integrate with an electro-mechanical adjustment system to perform the adjustment.

19. The system of claim 1, further comprising a compressor configured to compressibly change a porosity of the second sheet material.

20. The system of claim 1, wherein the cover is arranged in a first layer configured to cover a posterior portion of the head of the user and a second layer, at least partially covering the first layer, and configured to cover at least a lower portion of the face of the user, wherein the first layer and the second layer are each configured to leave the earholes of the user uncovered when the first layer and the second layer are in a first covered position on the head of the user.

21. The system of claim 20, wherein the second layer is configured to connect to the first layer to maintain their relative position.

22. The system of claim 21, wherein the second layer is configured to be disconnected from the first layer.

23. The system of claim 22, wherein a disconnected configuration between the first layer and the second layer allows the second layer to be extended to completely cover one or both ears of the user.

24. A protective headgear system comprising:

a cover configured to cover the head of a user, the cover comprising:

a substantially transparent facial shield having a perimeter;

a sheet sealingly coupled to the facial shield around its perimeter, wherein the sheet comprises a substantially anterior portion comprising a first sheet material configured to act as a substantial barrier to the passage of air, the sheet further comprising a substantially posterior portion comprising a second sheet material configured to filter contaminants from air, the sheet further comprising one or more seams between the first sheet material and the second sheet material;

a restrictive portion on the sheet, configured to significantly create a flow barrier between the cover and the neck of the user for providing an interior volume within the cover, significantly isolated from external air;

an air mover configured to draw some of the external air into the interior volume of the cover;

a filter coupled to the cover and configured to filter the air drawn by the air mover; and at least three fans configured to be carried within the cover and configured to direct internal air, including at least some exhaled air from the user, toward the second sheet material of the posterior portion of the sheet, wherein each of the at least three fans is located at a different location within the cover, and further comprising a controller configured to individually control the operation of each of the at least three fans, wherein the controller is configured to turn on or increase the speed of a first of the at least three fans while turning off or decreasing the speed of a second of the at least three fans.

25. A protective headcover system comprising:

a support configured to engage the head of a user and to cover at least an upper portion of the head of the user, the support comprising a lower portion having a perimeter comprising an undercut;

a cover configured to be coupled to the support and to surround the head of a user, the cover comprising a substantially transparent facial shield and sheet material sealingly coupled to the facial shield, wherein the cover further comprises a filter portion of the sheet material configured to filter contaminants from air, an upper opening in the sheet material configured to be positioned between the user's eyes and the top of the user's head during use and defined by an encircling edge of the sheet material, the edge configured to substantially surround and engage the perimeter of the support to minimize air flow between the cover and the support, wherein the edge comprises an elastic ring, and a lower barrier defining a lower opening in the sheet material, the lower barrier configured to significantly restrict air from exiting the cover at the neck of the user, wherein the cover, when coupled to the support and set in a restricting configuration with the user at the lower barrier, provides an interior space configured to substantially control the location of air supplied to the user; and a fan carried by the support and configured to force outside air into the interior volume, wherein the lower barrier serves to cause air within the interior volume, including at least some exhaled air from the user, to be forced out through the filter portion of the sheet material.

26. The system of claim 25, wherein the lower barrier comprises a cuff.

27. The system of claim 26, wherein the cuff is configured to secure below the chin of the user.

28. The system of claim 26, wherein the cuff is configured to secure around the neck of the user.

29. The system of claim 25, wherein the lower barrier comprises an elastic band configured to create a first barrier portion of the lower barrier around a posterior portion of the user's head and neck area and a cuff configured to create a second barrier portion of the lower barrier around an anterior portion of the user's head and neck area.

30. The system of claim 25, wherein the support comprises a helmet.

31. The system of claim 25, wherein the filter portion is located on a posterior portion of the cover.

* * * * *